US012812619B2

(12) United States Patent
Park et al.

(10) Patent No.: US 12,812,619 B2
(45) Date of Patent: Nov. 24, 2026

(54) METHOD AND DEVICE FOR APPLYING SEQUENCE AND PREAMBLE PUNCTURING TO A-PPDU IN WIRELESS LAN SYSTEM

(71) Applicant: LG ELECTRONICS INC., Seoul (KR)

(72) Inventors: Eunsung Park, Seoul (KR); Jinyoung Chun, Seoul (KR); Jinsoo Choi, Seoul (KR); Dongguk Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 333 days.

(21) Appl. No.: 18/686,836

(22) PCT Filed: Oct. 5, 2022

(86) PCT No.: PCT/KR2022/014975
§ 371 (c)(1),
(2) Date: Feb. 26, 2024

(87) PCT Pub. No.: WO2023/059055
PCT Pub. Date: Apr. 13, 2023

(65) Prior Publication Data
US 2024/0373406 A1 Nov. 7, 2024

(30) Foreign Application Priority Data

Oct. 6, 2021 (KR) ........................ 10-2021-0132568
Oct. 20, 2021 (KR) ........................ 10-2021-0140430

(51) Int. Cl.
*H04L 27/26* (2006.01)
*H04L 1/00* (2006.01)
(Continued)

(52) U.S. Cl.
CPC ....... *H04W 72/0453* (2013.01); *H04L 1/0013* (2013.01); *H04L 5/0044* (2013.01);
(Continued)

(58) Field of Classification Search
CPC . H04W 72/1263; H04W 84/12; H04W 4/006; H04W 36/0235; H04L 5/023; H04L 27/2692
See application file for complete search history.

(56) References Cited

U.S. PATENT DOCUMENTS

2020/0045656 A1 2/2020 Verma et al.
2021/0258115 A1* 8/2021 Liu ....................... H04L 5/0053
(Continued)

FOREIGN PATENT DOCUMENTS

WO 2021182744 9/2021
WO 2021182915 9/2021

OTHER PUBLICATIONS

Der-Jiunn Deng, Ying-Pei Lin, Xun Yang, Jun Zhu, Yun-Bo Li, Jun Luo, and Kwang-Cheng Chen, "IEEE 802.11ax: Highly Efficient WLANs for Intelligent Information Infrastructure", IEEE Communication Magazine, Dec. 2017, pp. 52-59 (Year: 2017).*
(Continued)

*Primary Examiner* — Salvador E Rivas
(74) *Attorney, Agent, or Firm* — LEE, HONG, DEGERMAN, KANG & WAIMEY

(57) ABSTRACT

The present specification (disclosure) proposes a method and device for applying a sequence and preamble puncturing to an A-PPDU in a wireless LAN system. Specifically, a reception STA receives an A-PPDU from a transmission STA. The reception STA decodes the A-PPDU. The A-PPDU includes a first PPDU for a primary 160 MHz channel and a second PPDU for a secondary 160 MHz channel. The reception STA is allocated to the secondary 160 MHz channel by SST. The first PPDU is transmitted on the basis of a first sequence for 160 MHz and a first preamble puncturing pattern for 160 MHz. The second PPDU is
(Continued)

transmitted on the basis of a second sequence for 160 MHz and a second preamble puncturing pattern for 160 MHz.

15 Claims, 17 Drawing Sheets

(51) Int. Cl.

| | |
|---|---|
| ***H04L 5/00*** | (2006.01) |
| ***H04W 72/0453*** | (2023.01) |
| ***H04W 72/1263*** | (2023.01) |
| *H04L 5/02* | (2006.01) |
| *H04W 36/02* | (2009.01) |
| *H04W 84/12* | (2009.01) |

(52) U.S. Cl.

CPC ..... *H04L 27/2692* (2013.01); *H04W 72/1263* (2013.01); *H04L 5/023* (2013.01); *H04W 36/0235* (2023.05); *H04W 84/12* (2013.01)

(56) References Cited

U.S. PATENT DOCUMENTS

| | | | | |
|---|---|---|---|---|
| 2021/0399864 | A1* | 12/2021 | Lim | H04L 1/0025 |
| 2022/0360397 | A1* | 11/2022 | Noh | H04W 72/0446 |
| 2023/0016370 | A1* | 1/2023 | Kim | H04L 5/0053 |
| 2024/0235757 | A1* | 7/2024 | Gong | H04L 5/0017 |

OTHER PUBLICATIONS

PCT International Application No. PCT/KR2022/014975, International Search Report dated Jan. 16, 2023, 3 pages.

Park et al., "Phase Rotation for 320MHz," IEEE 802.11-19/1493r1, Nov. 2019, 12 pages.

Cao et al., "Aggregated PPDU for Large BW," IEEE 802.11-20/0693r1, May 2020, 7 pages.

European Patent Office Application Serial No. 22878876.6, Search Report dated Sep. 9, 2025, 9 pages.

Au, "Specification Framework for TGbe," IEEE 802.11-19/1262r12, Aug. 2020, 46 pages.

* cited by examiner (a)

FIG. 13

| | |
|---|---|
| Version independent field | Version dependent field |

METHOD AND DEVICE FOR APPLYING SEQUENCE AND PREAMBLE PUNCTURING TO A-PPDU IN WIRELESS LAN SYSTEM

CROSS-REFERENCE TO RELATED APPLICATION(S)

This application is the National Stage filing under 35 U.S.C. 371 of International Application No. PCT/KR2022/014975, filed on Oct. 5, 2022, which claims the benefit of earlier filing date and right of priority to Korean Application Nos. 10-2021-0132568, filed on Oct. 6, 2021 and 10-2021-0140430, filed on Oct. 20, 2021, the contents of which are all incorporated by reference herein in their entirety.

TECHNICAL FIELD

The present disclosure relates to a method for configuring an A-PPDU in a WLAN system, and more particularly, to a method and apparatus for applying sequence and preamble puncturing to the A-PPDU.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for applying sequence and preamble puncturing to the A-PPDU in a WLAN system.

An example of the present specification proposes a method for applying sequence and preamble puncturing to the A-PPDU.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment is performed by a receiving station (STA), and the receiving STA may correspond to a non-access point (non-AP) STA. The transmitting STA may correspond to an AP STA.

This embodiment proposes a method for applying sequence and preamble puncturing so that a receiving STA assigned to a secondary 160 MHz channel by SST performs a unified operation in a situation where a transmitting STA transmits an A-PPDU. The A-PPDU may be composed of a combination of HE PPDU and EHT PPDU, or may be composed of only EHT PPDU. This has the effect of allowing the receiving STA to perform a unified operation regardless of how the A-PPDU is combined and transmitted.

A receiving station (STA) receives an Aggregated-Physical Protocol Data Unit (A-PPDU) from a transmitting STA.

The receiving STA decodes the A-PPDU.

The A-PPDU includes a High Efficiency (HE) PPDU for a primary 160 MHz channel and an Extreme High Throughput (EHT) PPDU for a secondary 160 MHz channel. The first PPDU may be a High Efficiency (HE) PPDU or a first Extreme High Throughput (EHT) PPDU. The second PPDU may be a second EHT PPDU.

The receiving STA is allocated to the secondary 160 MHz channel by Subchannel Selective Transmission (SST). That is, this embodiment assumes that SST is applied.

The first PPDU is transmitted based on a first sequence for 160 MHz and a first preamble puncturing pattern for 160 MHz. The second PPDU is transmitted based on a second sequence for 160 MHz and a second preamble puncturing pattern for 160 MHz.

According to the embodiment proposed in this specification, by indicating the bandwidth of the HE PPDU and EHT PPDU constituting the A-PPDU, efficient support of HE STA and EHT STA is possible. Since the AP allocates the R1 EHT STA only within the primary 160 MHz channel, there is no need to assign the R1 EHT STA to another channel through SST operation, etc., which can also have the advantage in terms of complexity of implementation.

BRIEF DESCRIPTION OF THE DRAWINGS

FIG. 13 shows the structure of a U-SIG.

DETAILED DESCRIPTION

Figure 1:
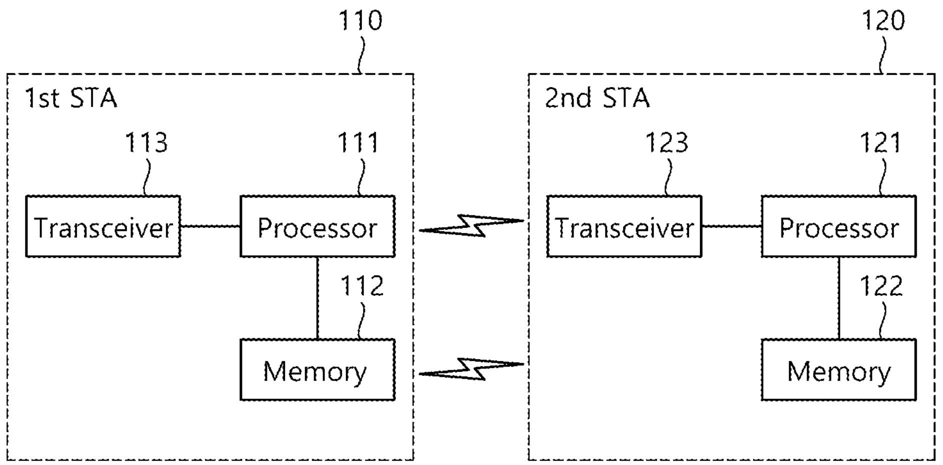
FIG. 1 shows an example of a transmitting apparatus and/or receiving apparatus of the present specification.
Figure 1:
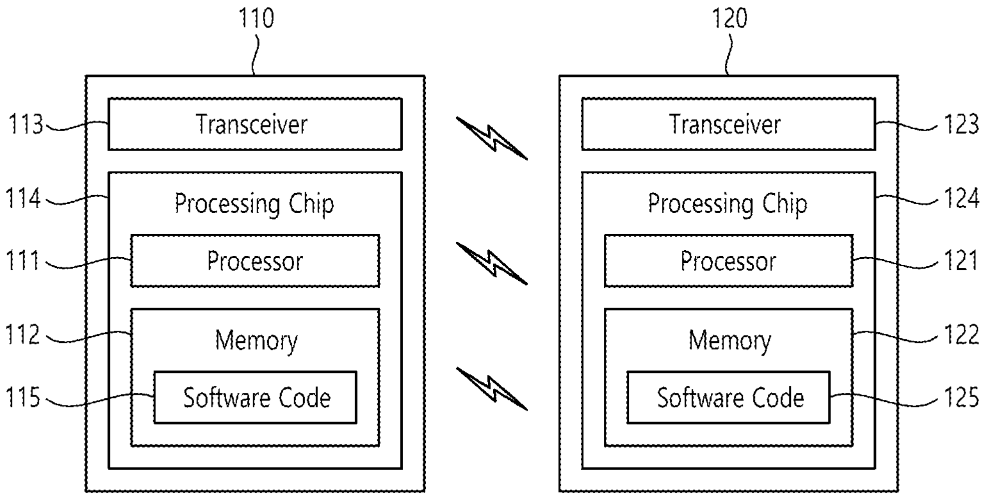

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU: 2) an operation of determining/configuring/obtaining a time resource or frequency resource (e.g., a subcarrier resource) or the like used for the sub-field (SIG, STF, LTF, Data) included the PPDU: 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU: 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
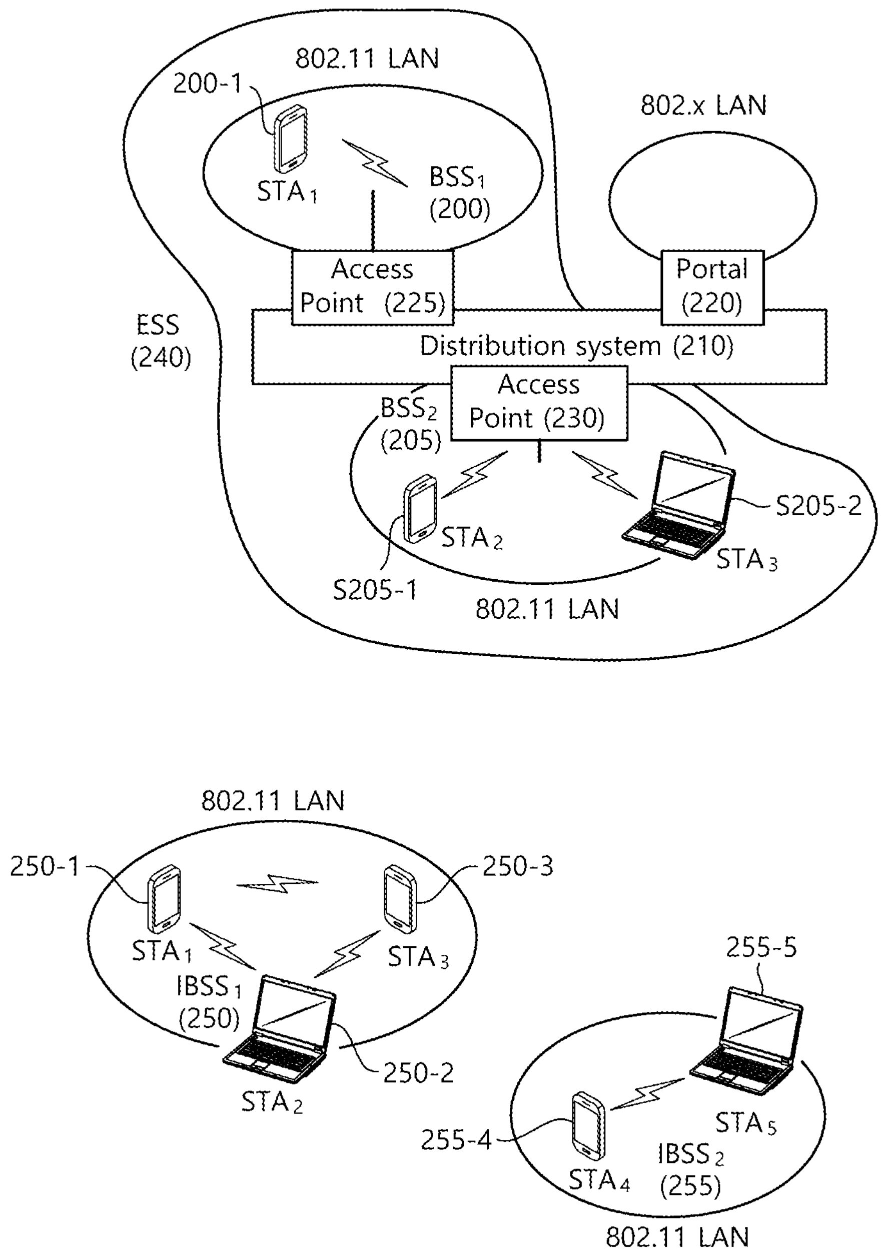
FIG. 2 is a conceptual view illustrating the structure of a wireless local area network (WLAN).

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
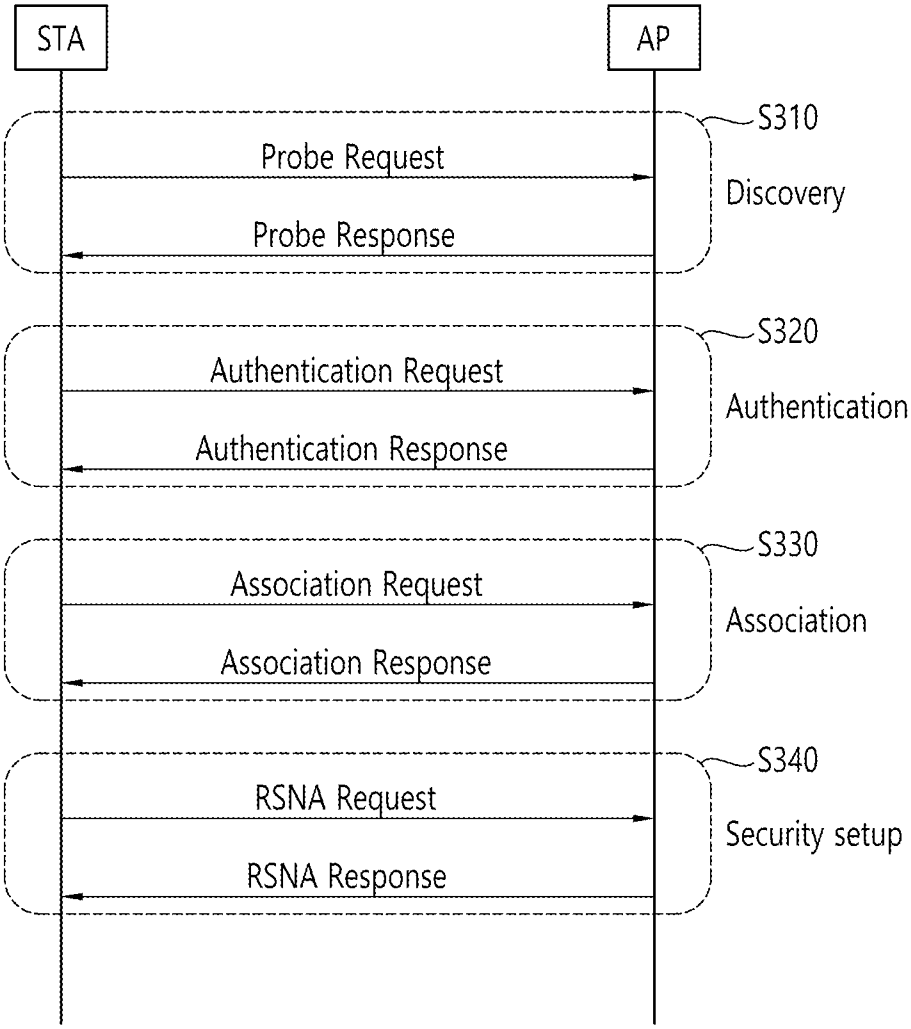
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

Figure 4:
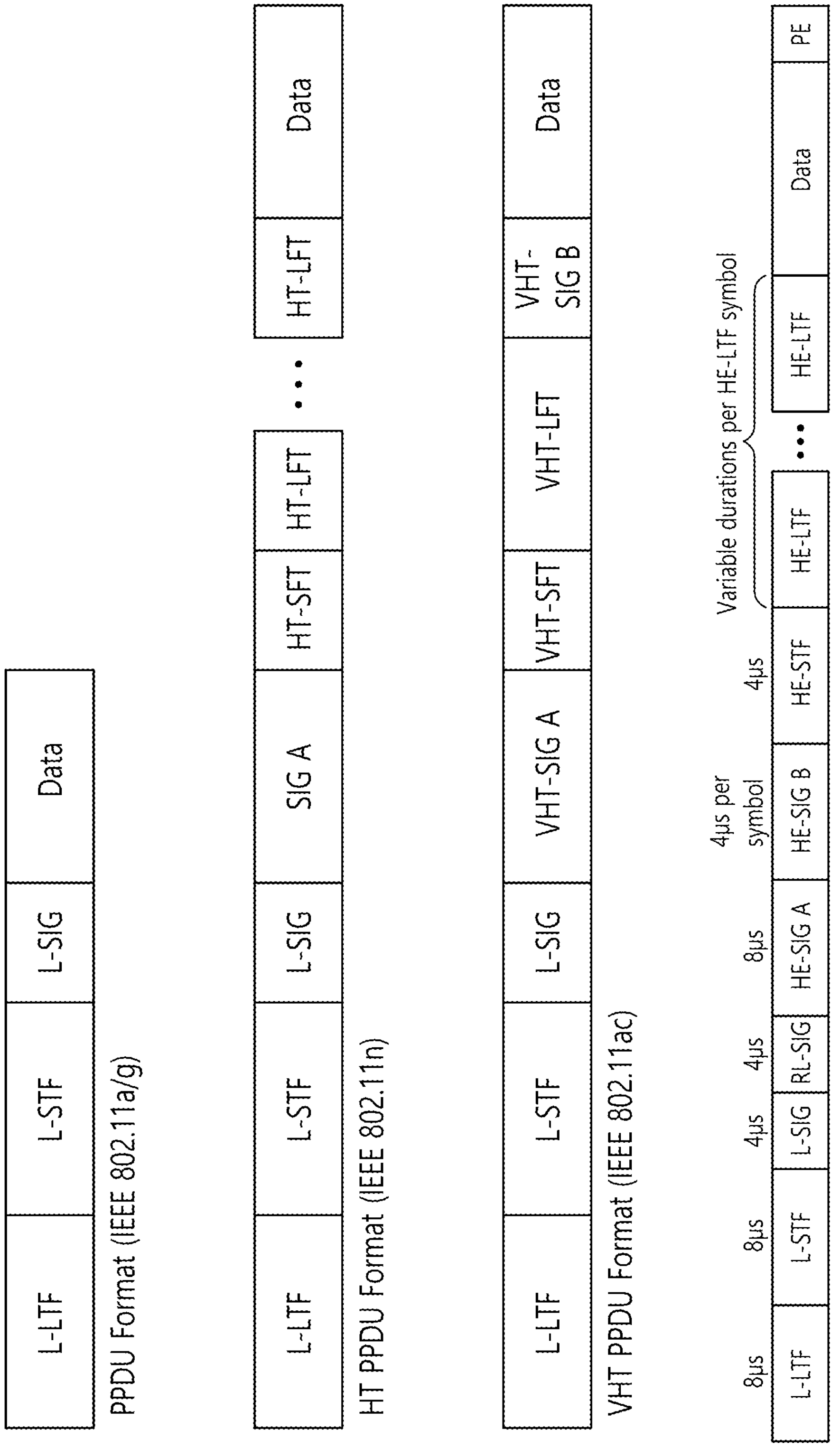
FIG. 4 illustrates an example of a PPDU used in an IEEE standard.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

Figure 5:
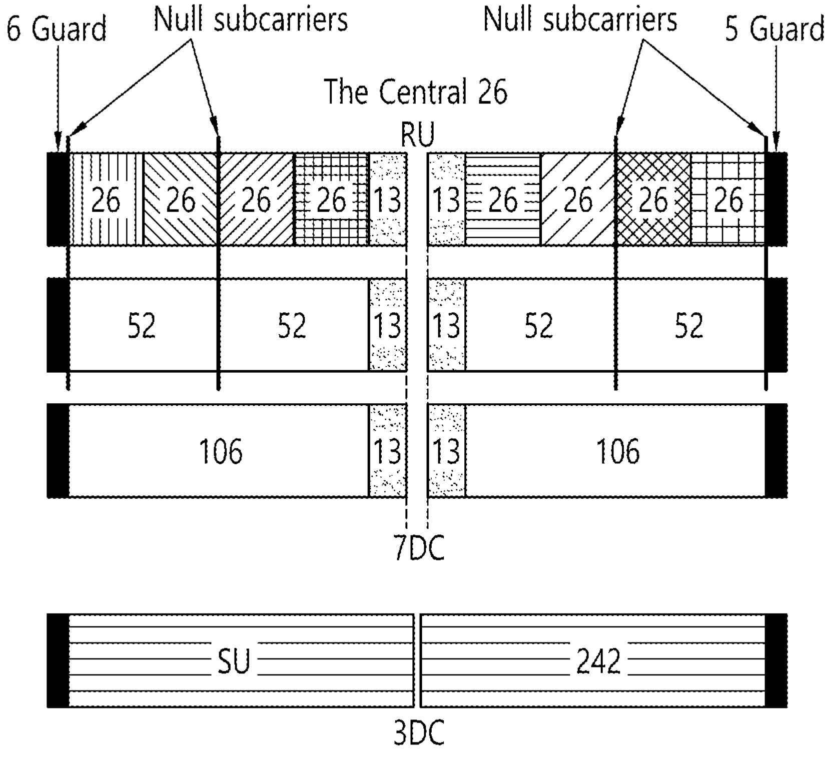
FIG. 5 illustrates a layout of resource units (RUs) used in a band of 20 MHz.

FIG. 5 illustrates a layout of resource units (RUS) used in a band of 20 MHz.

As illustrated in FIG. 5, resource units (RUs) corresponding to different numbers of tones (i.e., subcarriers) may be used to form some fields of an HE-PPDU. For example, resources may be allocated in illustrated RUs for an HE-STF, an HE-LTF, and a data field.

As illustrated in the uppermost part of FIG. 5, a 26-unit (i.e., a unit corresponding to 26 tones) may be disposed. Six tones may be used for a guard band in the leftmost band of the 20 MHz band, and five tones may be used for a guard band in the rightmost band of the 20 MHz band. Further, seven DC tones may be inserted in a center band, that is, a DC band, and a 26-unit corresponding to 13 tones on each of the left and right sides of the DC band may be disposed. A 26-unit, a 52-unit, and a 106-unit may be allocated to other bands. Each unit may be allocated for a receiving STA, that is, a user.

The layout of the RUs in FIG. 5 may be used not only for a multiple users (MUs) but also for a single user (SU), in which case one 242-unit may be used and three DC tones may be inserted as illustrated in the lowermost part of FIG. 5.

Although FIG. 5 proposes RUs having various sizes, that is, a 26-RU, a 52-RU, a 106-RU, and a 242-RU, specific sizes of RUs may be extended or increased. Therefore, the present embodiment is not limited to the specific size of each RU (i.e., the number of corresponding tones).

Figure 6:
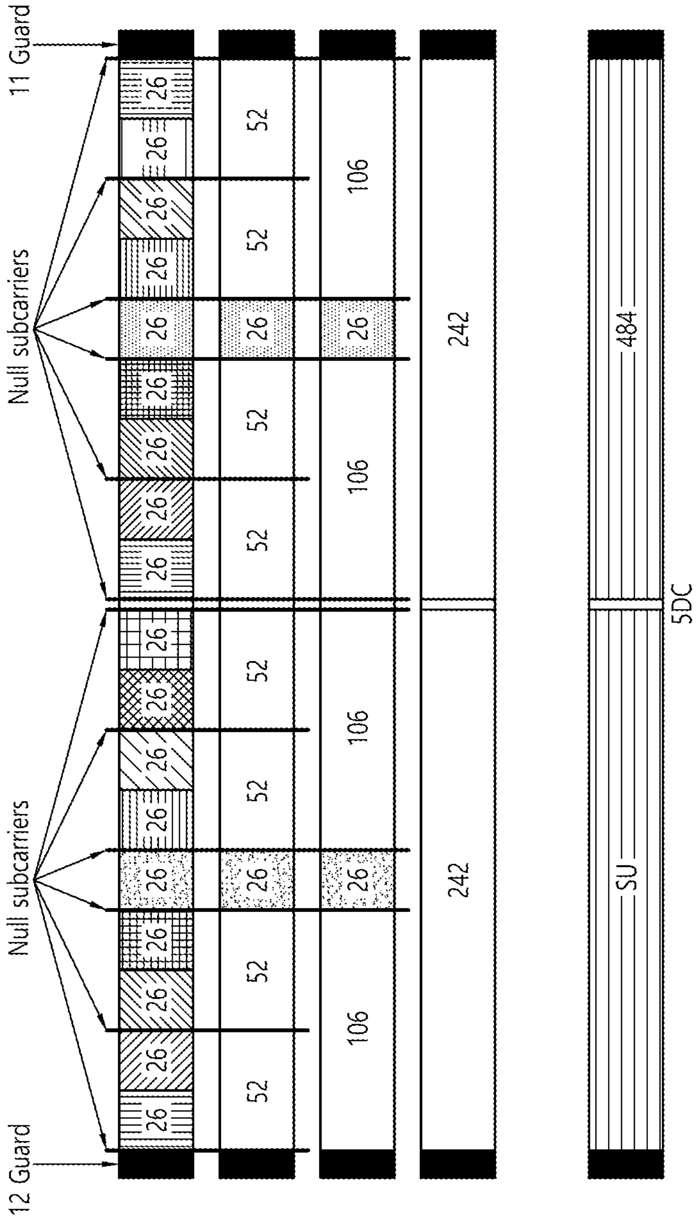
FIG. 6 illustrates a layout of RUs used in a band of 40 MHz.

FIG. 6 illustrates a layout of RUs used in a band of 40 MHz.

Similarly to FIG. 5 in which RUs having various sizes are used, a 26-RU, a 52-RU, a 106-RU, a 242-RU, a 484-RU, and the like may be used in an example of FIG. 6. Further, five DC tones may be inserted in a center frequency, 12 tones may be used for a guard band in the leftmost band of the 40 MHz band, and 11 tones may be used for a guard band in the rightmost band of the 40 MHz band.

As illustrated in FIG. 6, when the layout of the RUs is used for a single user, a 484-RU may be used. The specific number of RUs may be changed similarly to FIG. 5.

Figure 7:
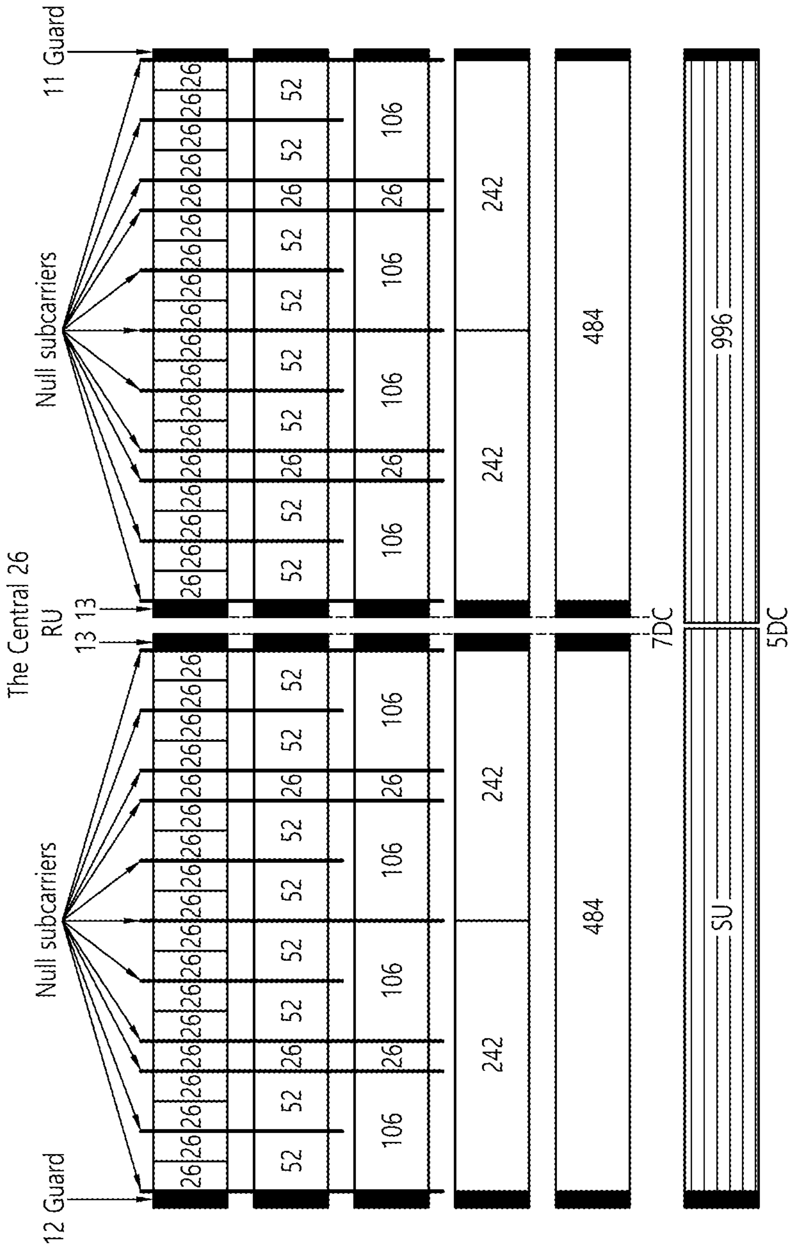
FIG. 7 illustrates a layout of RUs used in a band of 80 MHz.

FIG. 7 illustrates a layout of RUs used in a band of 80 MHz.

Similarly to FIG. 5 and FIG. 6 in which RUs having various sizes are used, a 26-RU, a 52-RU, a 106-RU, a 242-RU, a 484-RU, a 996-RU, and the like may be used in an example of FIG. 7. Further, seven DC tones may be inserted in the center frequency, 12 tones may be used for a guard band in the leftmost band of the 80 MHz band, and 11 tones may be used for a guard band in the rightmost band of the 80 MHz band. In addition, a 26-RU corresponding to 13 tones on each of the left and right sides of the DC band may be used.

As illustrated in FIG. 7, when the layout of the RUs is used for a single user, a 996-RU may be used, in which case five DC tones may be inserted.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Information related to a layout of the RU may be signaled through HE-SIG-B.

Figure 8:
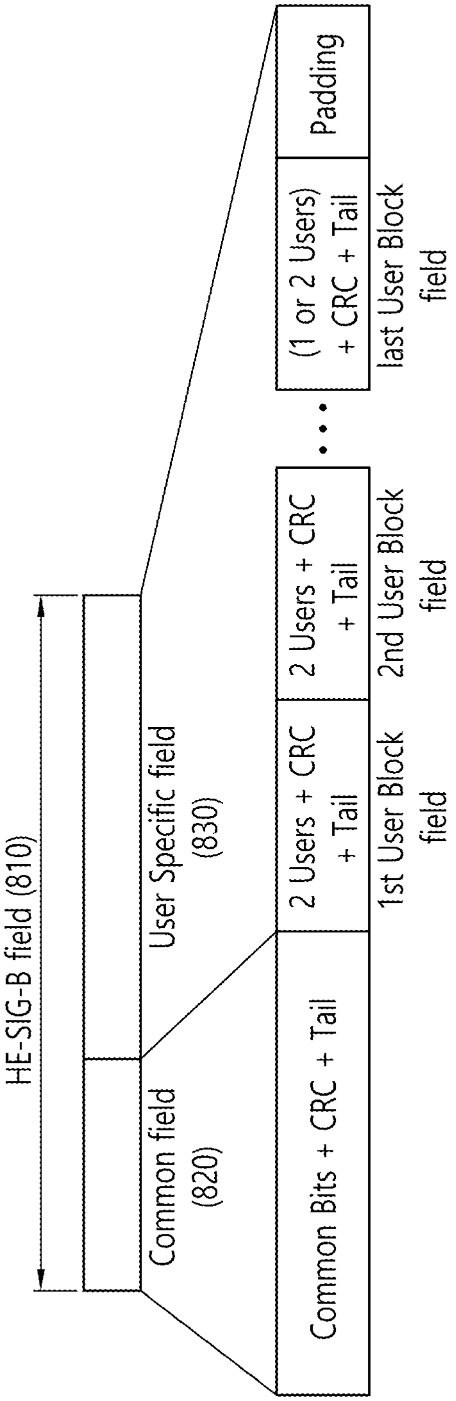
FIG. 8 illustrates a structure of an HE-SIG-B field.

FIG. 8 illustrates a structure of an HE-SIG-B field.

As illustrated, an HE-SIG-B field 810 includes a common field 820 and a user-specific field 830. The common field 820 may include information commonly applied to all users (i.e., user STAs) which receive SIG-B. The user-specific field 830 may be called a user-specific control field. When the SIG-B is transferred to a plurality of users, the user-specific field 830 may be applied only any one of the plurality of users.

As illustrated in FIG. 8, the common field 820 and the user-specific field 830 may be separately encoded.

The common field 820 may include RU allocation information of N+8 bits. For example, the RU allocation information may include information related to a location of an RU. For example, when a 20 MHz channel is used as shown in FIG. 5, the RU allocation information may include information related to a specific frequency band to which a specific RU (26-RU/52-RU/106-RU) is arranged.

An example of a case in which the RU allocation information consists of 8 bits is as follows.

TABLE 1

| RU Allocation subfield (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | | 26 | 26 | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |

As shown the example of FIG. 5, up to nine 26-RUs may be allocated to the 20 MHz channel. When the RU allocation information of the common field 820 is set to "00000000" as shown in Table 1, the nine 26-RUs may be allocated to a corresponding channel (i.e., 20 MHz). In addition, when the RU allocation information of the common field 820 is set to "00000001" as shown in Table 1, seven 26-RUs and one 52-RU are arranged in a corresponding channel. That is, in the example of FIG. 5, the 52-RU may be allocated to the rightmost side, and the seven 26-RUs may be allocated to the left thereof.

The example of Table 1 shows only some of RU locations capable of displaying the RU allocation information.

For example, the RU allocation information may include an example of Table 2 below.

TABLE 2

| 8 bits indices (B7 B6 B5 B4 B3 B2 B1 B0) | #1 | #2 | #3 | #4 | #5 | #6 | #7 | #8 | #9 | Number of entries |
|---|---|---|---|---|---|---|---|---|---|---|
| 01000$y_2y_1y_0$ | 106 | | | | 26 | 26 | 26 | 26 | 26 | 8 |
| 01001$y_2y_1y_0$ | 106 | | | | 26 | 26 | 26 | 52 | | 8 |

"01000y2y1y0" relates to an example in which a 106-RU is allocated to the leftmost side of the 20 MHz channel, and five 26-RUs are allocated to the right side thereof. In this case, a plurality of STAs (e.g., user-STAs) may be allocated to the 106-RU, based on a MU-MIMO scheme. Specifically, up to 8 STAs (e.g., user-STAs) may be allocated to the 106-RU, and the number of STAs (e.g., user-STAs) allocated to the 106-RU is determined based on 3-bit information (y2y1y0). For example, when the 3-bit information (y2y1y0) is set to N, the number of STAs (e.g., user-STAs) allocated to the 106-RU based on the MU-MIMO scheme may be N+1.

In general, a plurality of STAs (e.g., user STAs) different from each other may be allocated to a plurality of RUs. However, the plurality of STAs (e.g., user STAs) may be allocated to one or more RUs having at least a specific size (e.g., 106 subcarriers), based on the MU-MIMO scheme.

As shown in FIG. 8, the user-specific field 830 may include a plurality of user fields. As described above, the number of STAs (e.g., user STAs) allocated to a specific channel may be determined based on the RU allocation information of the common field 820. For example, when the RU allocation information of the common field 820 is "00000000", one user STA may be allocated to each of nine 26-RUs (e.g., nine user STAs may be allocated). That is, up to 9 user STAs may be allocated to a specific channel through an OFDMA scheme. In other words, up to 9 user STAs may be allocated to a specific channel through a non-MU-MIMO scheme.

For example, when RU allocation is set to "01000y2y1y0", a plurality of STAs may be allocated to the 106-RU arranged at the leftmost side through the MU-MIMO scheme, and five user STAs may be allocated to five 26-RUs arranged to the right side thereof through the non-MU MIMO scheme. This case is specified through an example of FIG. 9.

Figure 9:
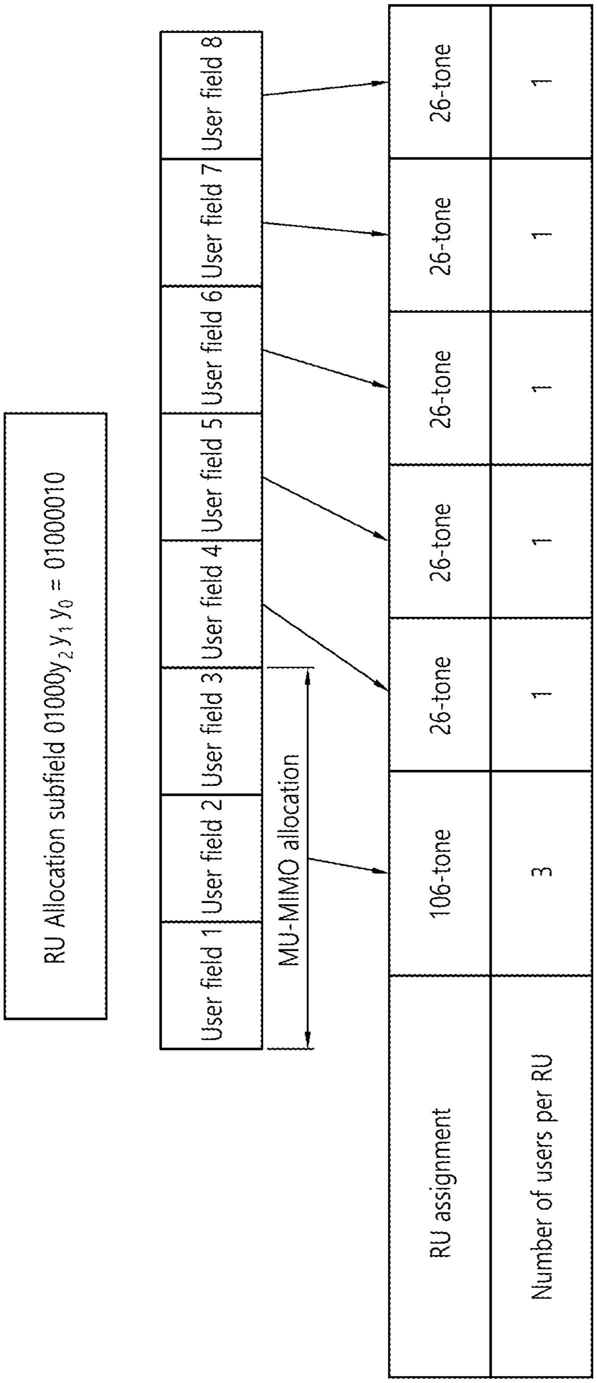
FIG. 9 illustrates an example in which a plurality of user STAs are allocated to the same RU through a MU-MIMO scheme.

FIG. 9 illustrates an example in which a plurality of user STAs are allocated to the same RU through a MU-MIMO scheme.

For example, when RU allocation is set to "01000010" as shown in FIG. 9, a 106-RU may be allocated to the leftmost side of a specific channel, and five 26-RUs may be allocated to the right side thereof. In addition, three user STAs may be allocated to the 106-RU through the MU-MIMO scheme. As a result, since eight user STAs are allocated, the user-specific field 830 of HE-SIG-B may include eight user fields.

The eight user fields may be expressed in the order shown in FIG. 9. In addition, as shown in FIG. 8, two user fields may be implemented with one user block field.

The user fields shown in FIG. 8 and FIG. 9 may be configured based on two formats. That is, a user field related to a MU-MIMO scheme may be configured in a first format, and a user field related to a non-MIMO scheme may be configured in a second format. Referring to the example of FIG. 9, a user field 1 to a user field 3 may be based on the first format, and a user field 4 to a user field 8 may be based on the second format. The first format or the second format may include bit information of the same length (e.g., 21 bits).

Each user field may have the same size (e.g., 21 bits). For example, the user field of the first format (the first of the MU-MIMO scheme) may be configured as follows.

For example, a first bit (i.e., B0-B10) in the user field (i.e., 21 bits) may include identification information (e.g., STA-ID, partial AID, etc.) of a user STA to which a corresponding user field is allocated. In addition, a second bit (i.e., B11-B14) in the user field (i.e., 21 bits) may include information related to a spatial configuration.

In addition, a third bit (i.e., B15-18) in the user field (i.e., 21 bits) may include modulation and coding scheme (MCS) information. The MCS information may be applied to a data field in a PPDU including corresponding SIG-B.

An MCS, MCS information, an MCS index, an MCS field, or the like used in the present specification may be indicated by an index value. For example, the MCS information may be indicated by an index 0 to an index 11. The MCS information may include information related to a constellation modulation type (e.g., BPSK, QPSK, 16-QAM, 64-QAM, 256-QAM, 1024-QAM, etc.) and information related to a coding rate (e.g., 1/2, 2/3, 3/4, 5/6e, etc.). Information related to a channel coding type (e.g., LCC or LDPC) may be excluded in the MCS information.

In addition, a fourth bit (i.e., B19) in the user field (i.e., 21 bits) may be a reserved field.

In addition, a fifth bit (i.e., B20) in the user field (i.e., 21 bits) may include information related to a coding type (e.g., BCC or LDPC). That is, the fifth bit (i.e., B20) may include information related to a type (e.g., BCC or LDPC) of channel coding applied to the data field in the PPDU including the corresponding SIG-B.

The aforementioned example relates to the user field of the first format (the format of the MU-MIMO scheme). An example of the user field of the second format (the format of the non-MU-MIMO scheme) is as follows.

A first bit (e.g., B0-B10) in the user field of the second format may include identification information of a user STA. In addition, a second bit (e.g., B11-B13) in the user field of the second format may include information related to the number of spatial streams applied to a corresponding RU. In addition, a third bit (e.g., B14) in the user field of the second format may include information related to whether a beamforming steering matrix is applied. A fourth bit (e.g., B15-B18) in the user field of the second format may include modulation and coding scheme (MCS) information. In addition, a fifth bit (e.g., B19) in the user field of the second format may include information related to whether dual carrier modulation (DCM) is applied. In addition, a sixth bit (i.e., B20) in the user field of the second format may include information related to a coding type (e.g., BCC or LDPC).

Hereinafter, a PPDU transmitted/received in a STA of the present specification will be described.

Figure 10:
FIG. 10 illustrates an example of a PPDU used in the present specification.

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 KHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 KHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier {subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index {−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index-28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth: 2) a field including information related to an MCS scheme applied to EHT-SIG: 3) an indication field including information regarding whether a dual subcarrier modulation (DCM) scheme is applied to EHT-SIG: 4) a field including information related to the number of symbol used for EHT-SIG; 5) a field including information regarding whether the EHT-SIG is generated across a full band: 6) a field including information related to a type of EHT-LTF/STF; and 7) information related to a field indicating an EHT-LTF length and a CP length.

Preamble puncturing may be applied to the PPDU of FIG. 10. The preamble puncturing implies that puncturing is applied to part (e.g., a secondary 20 MHz band) of the full band. For example, when an 80 MHz PPDU is transmitted, an STA may apply puncturing to the secondary 20 MHz band out of the 80 MHz band, and may transmit a PPDU only through a primary 20 MHz band and a secondary 40 MHz band.

For example, a pattern of the preamble puncturing may be configured in advance. For example, when a first puncturing pattern is applied, puncturing may be applied only to the secondary 20 MHz band within the 80 MHz band. For example, when a second puncturing pattern is applied, puncturing may be applied to only any one of two secondary 20 MHz bands included in the secondary 40 MHz band within the 80 MHz band. For example, when a third puncturing pattern is applied, puncturing may be applied to only the secondary 20 MHz band included in the primary 80 MHz band within the 160 MHz band (or 80+80 MHz band). For example, when a fourth puncturing is applied, puncturing may be applied to at least one 20 MHz channel not belonging to a primary 40 MHz band in the presence of the primary 40 MHz band included in the 80 MHaz band within the 160 MHz band (or 80+80 MHz band).

Information related to the preamble puncturing applied to the PPDU may be included in U-SIG and/or EHT-SIG. For example, a first field of the U-SIG may include information related to a contiguous bandwidth, and second field of the U-SIG may include information related to the preamble puncturing applied to the PPDU.

For example, the U-SIG and the EHT-SIG may include the information related to the preamble puncturing, based on the following method. When a bandwidth of the PPDU exceeds 80 MHz, the U-SIG may be configured individually in unit of 80 MHz. For example, when the bandwidth of the PPDU is 160 MHz, the PPDU may include a first U-SIG for a first 80 MHz band and a second U-SIG for a second 80 MHz band. In this case, a first field of the first U-SIG may include information related to a 160 MHz bandwidth, and a second field of the first U-SIG may include information related to a preamble puncturing (i.e., information related to a preamble puncturing pattern) applied to the first 80 MHz band. In addition, a first field of the second U-SIG may include information related to a 160 MHz bandwidth, and a second field of the second U-SIG may include information related to a preamble puncturing (i.e., information related to a preamble puncturing pattern) applied to the second 80 MHz band. Meanwhile, an EHT-SIG contiguous to the first U-SIG may include information related to a preamble puncturing applied to the second 80 MHz band (i.e., information related to a preamble puncturing pattern), and an EHT-SIG contiguous to the second U-SIG may include information related to a preamble puncturing (i.e., information related to a preamble puncturing pattern) applied to the first 80 MHz band.

Additionally or alternatively, the U-SIG and the EHT-SIG may include the information related to the preamble puncturing, based on the following method. The U-SIG may include information related to a preamble puncturing (i.e., information related to a preamble puncturing pattern) for all bands. That is, the EHT-SIG may not include the information related to the preamble puncturing, and only the U-SIG may include the information related to the preamble puncturing (i.e., the information related to the preamble puncturing pattern).

The U-SIG may be configured in unit of 20 MHz. For example, when an 80 MHz PPDU is configured, the U-SIG may be duplicated. That is, four identical U-SIGs may be included in the 80 MHz PPDU. PPDUs exceeding an 80 MHz bandwidth may include different U-SIGs.

The EHT-SIG of FIG. 10 may include control information for the receiving STA. The EHT-SIG may be transmitted through at least one symbol, and one symbol may have a length of 4 μs. Information related to the number of symbols used for the EHT-SIG may be included in the U-SIG.

The EHT-SIG may include a technical feature of the HE-SIG-B described with reference to FIG. 8 and FIG. 9. For example, the EHT-SIG may include a common field and a user-specific field as in the example of FIG. 8. The common field of the EHT-SIG may be omitted, and the number of user-specific fields may be determined based on the number of users.

As in the example of FIG. 8, the common field of the EHT-SIG and the user-specific field of the EHT-SIG may be individually coded. One user block field included in the user-specific field may include information for two users, but a last user block field included in the user-specific field may include information for one user. That is, one user block field of the EHT-SIG may include up to two user fields. As in the example of FIG. 9, each user field may be related to MU-MIMO allocation, or may be related to non-MU-MIMO allocation.

As in the example of FIG. 8, the common field of the EHT-SIG may include a CRC bit and a tail bit. A length of the CRC bit may be determined as 4 bits. A length of the tail bit may be determined as 6 bits, and may be set to '000000'.

As in the example of FIG. 8, the common field of the EHT-SIG may include RU allocation information. The RU allocation information may imply information related to a location of an RU to which a plurality of users (i.e., a plurality of receiving STAs) are allocated. The RU allocation information may be configured in unit of 8 bits (or N bits), as in Table 1.

A mode in which the common field of the EHT-SIG is omitted may be supported. The mode in the common field of the EHT-SIG is omitted may be called a compressed mode. When the compressed mode is used, a plurality of users (i.e., a plurality of receiving STAs) may decode the PPDU (e.g., the data field of the PPDU), based on non-OFDMA. That is, the plurality of users of the EHT PPDU may decode the PPDU (e.g., the data field of the PPDU) received through the same frequency band. Meanwhile, when a non-compressed mode is used, the plurality of users of the EHT PPDU may decode the PPDU (e.g., the data field of the PPDU), based on OFDMA. That is, the plurality of users of the EHT PPDU may receive the PPDU (e.g., the data field of the PPDU) through different frequency bands.

The EHT-SIG may be configured based on various MCS schemes. As described above, information related to an MCS scheme applied to the EHT-SIG may be included in U-SIG. The EHT-SIG may be configured based on a DCM scheme. For example, among N data tones (e.g., 52 data tones) allocated for the EHT-SIG, a first modulation scheme may be applied to half of consecutive tones, and a second modulation scheme may be applied to the remaining half of the consecutive tones. That is, a transmitting STA may use the first modulation scheme to modulate specific control information through a first symbol and allocate it to half of the consecutive tones, and may use the second modulation scheme to modulate the same control information by using a second symbol and allocate it to the remaining half of the consecutive tones. As described above, information (e.g., a 1-bit field) regarding whether the DCM scheme is applied to the EHT-SIG may be included in the U-SIG. An HE-STF of FIG. 10 may be used for improving automatic gain control estimation in a multiple input multiple output (MIMO) environment or an OFDMA environment. An HE-LTF of FIG. 10 may be used for estimating a channel in the MIMO environment or the OFDMA environment.

Information related to a type of STF and/or LTF (information related to a GI applied to LTF is also included) may be included in a SIG-A field and/or SIG-B field or the like of FIG. 10.

A PPDU (e.g., EHT-PPDU) of FIG. 10 may be configured based on the example of FIG. 5 and FIG. 6.

For example, an EHT PPDU transmitted on a 20 MHz band, i.e., a 20 MHz EHT PPDU, may be configured based on the RU of FIG. 5. That is, a location of an RU of EHT-STF, EHT-LTF, and data fields included in the EHT PPDU may be determined as shown in FIG. 5.

An EHT PPDU transmitted on a 40 MHz band, i.e., a 40 MHz EHT PPDU, may be configured based on the RU of FIG. 6. That is, a location of an RU of EHT-STF, EHT-LTF, and data fields included in the EHT PPDU may be determined as shown in FIG. 6.

Since the RU location of FIG. 6 corresponds to 40 MHz, a tone-plan for 80 MHz may be determined when the pattern of FIG. 6 is repeated twice. That is, an 80 MHz EHT PPDU may be transmitted based on a new tone-plan in which not the RU of FIG. 7 but the RU of FIG. 6 is repeated twice.

When the pattern of FIG. 6 is repeated twice, 23 tones (i.e., 11 guard tones+12 guard tones) may be configured in a DC region. That is, a tone-plan for an 80 MHz EHT PPDU allocated based on OFDMA may have 23 DC tones. Unlike this, an 80 MHz EHT PPDU allocated based on non-OFDMA (i.e., a non-OFDMA full bandwidth 80 MHz PPDU) may be configured based on a 996-RU, and may include 5 DC tones, 12 left guard tones, and 11 right guard tones.

A tone-plan for 160/240/320 MHz may be configured in such a manner that the pattern of FIG. 6 is repeated several times.

The PPDU of FIG. 10 may be determined (or identified) as an EHT PPDU based on the following method.

A receiving STA may determine a type of an RX PPDU as the EHT PPDU, based on the following aspect. For example, the RX PPDU may be determined as the EHT PPDU: 1) when a first symbol after an L-LTF signal of the RX PPDU is a BPSK symbol: 2) when RL-SIG in which the L-SIG of the RX PPDU is repeated is detected; and 3) when a result of applying "modulo 3" to a value of a length field of the L-SIG of the RX PPDU is detected as "0". When the RX PPDU is determined as the EHT PPDU, the receiving STA may detect a type of the EHT PPDU (e.g., an SU/MU/Trigger-based/Extended Range type), based on bit information included in a symbol after the RL-SIG of FIG. 10. In other words, the receiving STA may determine the RX PPDU as the EHT PPDU, based on: 1) a first symbol after an L-LTF signal, which is a BPSK symbol: 2) RL-SIG contiguous to the L-SIG field and identical to L-SIG: 3) L-SIG including a length field in which a result of applying “modulo 3” is set to “0”; and 4) a 3-bit PHY version identifier of the aforementioned U-SIG (e.g., a PHY version identifier having a first value).

For example, the receiving STA may determine the type of the RX PPDU as the EHT PPDU, based on the following aspect. For example, the RX PPDU may be determined as the HE PPDU: 1) when a first symbol after an L-LTF signal is a BPSK symbol: 2) when RL-SIG in which the L-SIG is repeated is detected; and 3) when a result of applying “modulo 3” to a value of a length field of the L-SIG is detected as “1” or “2”.

For example, the receiving STA may determine the type of the RX PPDU as a non-HT, HT, and VHT PPDU, based on the following aspect. For example, the RX PPDU may be determined as the non-HT, HT, and VHT PPDU: 1) when a first symbol after an L-LTF signal is a BPSK symbol; and 2) when RL-SIG in which L-SIG is repeated is not detected. In addition, even if the receiving STA detects that the RL-SIG is repeated, when a result of applying “modulo 3” to the length value of the L-SIG is detected as “0”, the RX PPDU may be determined as the non-HT, HT, and VHT PPDU.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-) association request frame, a (re-) association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
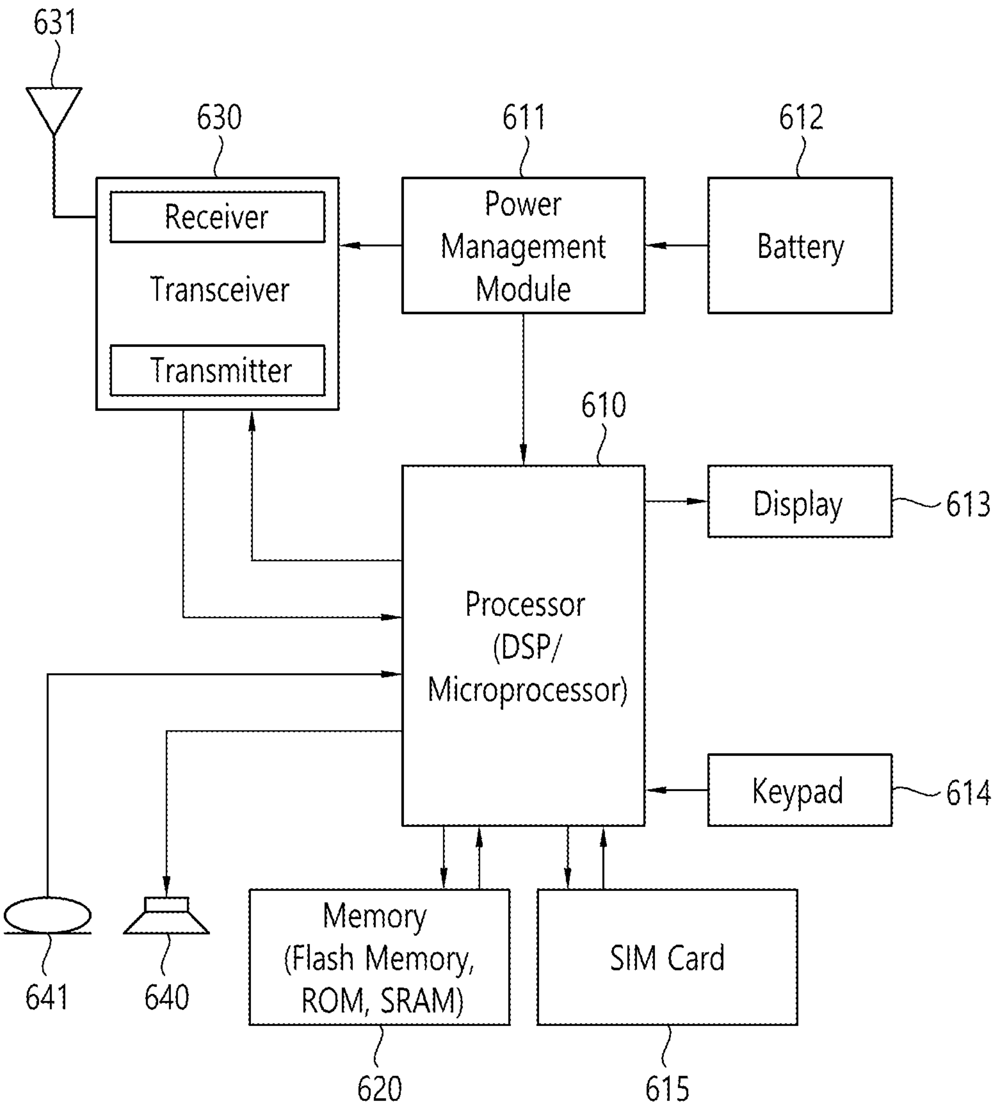
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

1. Embodiments Applicable to this Specification

In the WLAN 802.11be system, transmission of increased streams is considered by using a wider band than the existing 802.11ax or using more antennas to increase peak throughput. In addition, the present specification also considers a method of aggregating and using various bands/links.

Figure 12:
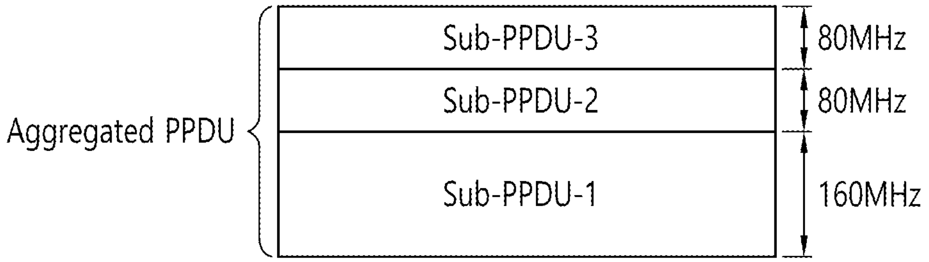
FIG. 12 is a diagram of a representative A-PPDU.

This specification proposes a method for always using the same phase rotation/EHT-STF/EHT-LTF sequence and applying the same preamble puncturing to the EHT PPDU portion transmitted on the same channel for A-PPDU or EHT PPDU to which SST is applied when transmitting and receiving 320 MHz PPDU in situations considering wide bandwidth, etc. FIG. 12 is a diagram of a representative A-PPDU.

Referring to FIG. 12, each Sub-PPDU may be a HE PPDU/EHT PPDU or a PPDU of a later version of EHT (or EHT Release 2). However, it may be desirable for HE PPDU to be transmitted within Primary 160 MHz. Additionally, it may be desirable for the same type of Sub-PPDU to be transmitted within the primary 160 MHz and secondary 160 MHz. By the SST mechanism, each STA can be assigned to a specific 80 MHz or higher band, and a Sub-PPDU for each STA can be transmitted in that band, or each STA can transmit a Sub-PPDU. For example, by SST (Subchannel Selective Transmission), an STA allocated to Primary 160 MHz transmits and receives HE PPDUs, and an STA allocated to Secondary 160 MHz transmits and receives EHT PPDUs.

FIG. 10 shows a representative EHT MU PPDU format.

Referring to FIG. 10, U-SIG has a length of 4 us per symbol, and is composed of two symbols, so it has a total length of 8 μs. EHT-SIG has a length of 4 us per symbol. EHT-STF has a length of 4 μs, and the symbol section of EHT-LTF may vary depending on the GI (Guard Interval) and LTF size.

Figure 13:
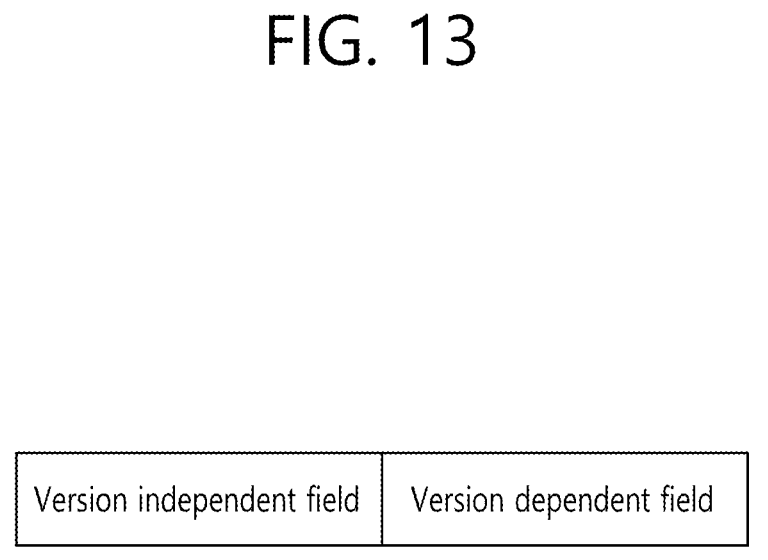

FIG. 13 shows the structure of a U-SIG.

The Universal-Signal (U-SIG) is divided into a version independent field and a version dependent field, as shown in FIG. 13.

The bandwidth of the PPDU can be indicated using the Bandwidth (BW) field, which can be included in the version independent field of the U-SIG. Additionally, in addition to the bandwidth field, the 20 MHz-based preamble puncturing pattern within each 80 MHz can also be indicated. This can help STAs decoding a specific 80 MHz decode EHT-SIG. Therefore, assuming that this information is carried in the U-SIG, the configuration of the U-SIG may change every 80 MHz.

In addition, the version independent field may include a 3-bit version identifier indicating a Wi-Fi version after 802.11be and 802.11be, a 1-bit DL/UL field, BSS color, TXOP duration, etc., and the version dependent field may include information such as PPDU type. In addition, the U-SIG is jointly encoded with two symbols and consists of 52 data tones and 4 pilot tones for each 20 MHz. Also, it is modulated in the same way as HE-SIG-A. That is, it is modulated at BPSK 1/2 code rate. Additionally, EHT-SIG can be divided into common fields and user specific fields and can be encoded with variable Modulation and Coding Scheme (MCS). As in the existing 802.11ax, 1 2 1 2 . . . in units of 20 MHz. It may have a structure (may be composed of other structures, for example, 1 2 3 4 . . . or 1 2 1 2 3 4 3 4 . . . ), may also be configured in units of 80 MHz, and in a bandwidth of 80 MHz or higher, the EHT-SIG may be duplicated in units of 80 MHz or composed of different information.

In this specification, it is assumed that when the aggregated PPDU consists of HE and EHT PPDU, the HE PPDU is transmitted within Primary 160 MHz and the EHT PPDU is transmitted within Secondary 160 MHz. In this case, each HE/EHT PPDU can be transmitted at a maximum of 160 MHz, and transmission below 80 MHz is also possible, but transmission below 80 MHz may be undesirable because it may cause channel usage of less than 50%. Therefore, only 80/160 MHz is considered for the BW of each HE/EHT PPDU. However, additional puncturing may be applied within each 80/160 MHz PPDU.

The HE PPDU can be a UL/DL PPDU (determined according to the UL/DL of the A-PPDU), and the BW indicator of the HE PPDU can use the existing 802.11ax method as is. That is, it can be indicated using the BW field in HE-SIG-A defined in HE (ER) SU PPDU, HE MU PPDU, and HE TB PPDU.

The EHT PPDU may also be a UL/DL PPDU (determined according to the UL/DL of the A-PPDU), and the BW indicator of the EHT PPDU may use a reserved field among the BW fields of the U-SIG. Below is the BW field in the U-SIG field of EHT MU PPDU.

TABLE 3

| Two parts of U-SIG | Bit | Field | Number of bits | Description |
|---|---|---|---|---|
| U-SIG-1 | B3-B5 | Bandwidth | 3 | Set to 0 for 20 MHz.<br>Set to 1 for 40 MHz.<br>Set to 2 for 80 MHz.<br>Set to 3 for 160 MHz.<br>Set to 4 for 320 MHz-1.<br>Set to 5 for 320 MHz-2.<br>Values 6 and 7 are Validate. |

Below is the BW field in the U-SIG field of the EHT TB PPDU.

TABLE 4

| Two parts of U-SIG | Bit | Field | Number of bits | Description |
|---|---|---|---|---|
| U-SIG-1 | B3-B5 | BW | 3 | Set to 0 for 20 MHz.<br>Set to 1 for 40 MHz.<br>Set to 2 for 80 MHz.<br>Set to 3 for 160 MHz.<br>Set to 4 for 320 MHz-1.<br>Set to 5 for 320 MHz-2.<br>Values 6 and 7 are Validate. |

When transmitting and receiving such A-PPDU (a combination of HE PPDU and EHT PPDU), SST can be basically applied. STAs allocated to Secondary 160 MHz may basically be EHT STAs, may be STAs with the dot11EHTBaseLineFeatureImplementedOnly parameter set to false, and may transmit and receive EHT PPDUs. STAs allocated to Primary 160 MHz may be HE STAs and EHT STAs, and EHT STAs may be STAs with the dot11EHTBaseLineFeatureImplementedOnly parameter set to true or false, and may transmit and receive HE PPDUs.

Additionally, SST may be applied even when transmitting and receiving one EHT PPDU rather than an A-PPDU. In this case, EHT STA can always be assigned to Primary/Secondary 160 MHz. However, the EHT STA allocated to Secondary 160 MHz may be an STA with the dot11EHTBaseLineFeatureImplementedOnly parameter set to false. STAs allocated to Primary 160 MHz may be STAs with the dot11EHTBaseLineFeatureImplementedOnly parameter set to true or false.

When BW is indicated when transmitting and receiving an A-PPDU (a combination of HE PPDU and EHT PPDU), it is obvious that the bandwidth of the HE PPDU will be set to a maximum of 160 MHz depending on the transmitted size. However, the bandwidth of the EHT PPDU transmitted and received at Secondary 160 MHz can be set to a maximum of 160 MHz simply depending on the transmitted size, or can be set to a maximum of 320 MHz considering the overall size of the A-PPDU. In addition, various types of A-PPDU indicators can also be considered, and in this case, Reserved/Disregard/Validate bits can be used among various signaling fields.

When SST is applied, transmission and reception of only one 320 MHz EHT PPDU rather than A-PPDU can also be considered, and in this case, BW can be indicated at 320 MHz. Alternatively, it can be configured as an A-PPDU that is a combination of EHT PPDU and EHT PPDU, similar to A-PPDU that is a combination of EHT PPDU and HE PPDU. Each sub EHT PPDU can configure Primary/Secondary 160 MHZ, and the bandwidth of each sub EHT PPDU can be set to a maximum of 160 MHz or simply set to 320 MHz considering the entire A-PPDU size. Additionally, various types of A-PPDU indicators can also be considered. Additionally, each sub EHT PPDU may be configured in units of 80 MHz. In this case, the bandwidth of each sub EHT PPDU can be set to a maximum of 80 MHz. Alternatively, the bandwidth of each sub EHT PPDU can be set to a maximum of 160 MHz, or can be set to a maximum of 320 MHz considering the bandwidth of the entire A-PPDU. Additionally, various types of A-PPDU indicators may be considered.

As can be seen above, if the EHT STA is assigned to secondary 160 MHz by SST, regardless of whether A-PPDU (a combination of HE PPDU and EHT PPDU or only EHT PPDU) is transmitted or only one EHT PPDU is transmitted, the EHT STA always transmits and receives EHT PPDU. Considering this situation, for EHT STAs allocated to Secondary 160 MHz, where EHT PPDUs are transmitted and received, regardless of PPDU type and bandwidth indication, it may be advantageous for implementation if the method for applying the phase rotation/EHT-STF/EHT-LTF sequence and the method for indicating preamble puncturing (the preamble puncturing method can be considered only in the case of DL) are set in the same form. Likewise, in the case of the PPDU type in which EHT PPDU is transmitted and received at Primary 160 MHZ, for the EHT STA allocated to the primary 160 MHz, it may be advantageous in implementation if the method for applying phase rotation/EHT-STF/EHT-LTF sequence and the method for indicating preamble puncturing are set in the same form.

Therefore, considering this situation when applying SST, in the transmission of A-PPDU (a combination of HE PPDU and EHT PPDU or only EHT PPDU) or transmission of only one EHT PPDU rather than A-PPDU, as shown below, this specification proposes a method for applying phase rotation/ EHT-STF/EHT-LTF sequence and a method for indicating preamble puncturing. Below is the Punctured Channel Information field defined in the U-SIG of the EHT MU PPDU, and the Punctured Channel Information field indicates the preamble puncturing pattern.

TABLE 5

| Two parts of U-SIG | Bit | Field | Number of bits | Description |
|---|---|---|---|---|
| | B3-B7 | Punctured Channel Information | 5 | If the PPDU Type And Compression Mode field is set to 1 regardless of the value of the UL/DL field, or the PPDU Type And Compression Mode field is set to 2 and the UL/DL field is 0: Indicates the puncturing information of this non-OFDMA transmission. See Table 36-30 (Definition of the Punctured Channel Information field in the U-SIG for an EHT MU PPDU using non-OFDMA transmissions) for the definition. Undefined values of this field are Validate. If the PPDU Type And Compression Mode field is set to 0 and the UL/DL field is 0: If the Bandwidth field is set to a value between 2 and 5, which indicates an 80 MHz, 160 MHz or 320 MHz PPDU, then B3-B6 is a 4-bit bitmap that indicates which 20 MHz subchannel is punctured in the 80 MHz frequency subblock where U-SIG processing is performed. The 4-bit bitmap is indexed by the 20 MHz subchannels in ascending order with B3 indicating the lowest frequency 20 MHz subchannel. For each of the bits B3-B6, a value of 0 indicates that the corresponding 20 MHz channel is punctured, and a value of 1 is used otherwise. The following allowed punctured patterns (B3-B6) are defined for an 80 MHz frequency subblock: 1111 (no puncturing), 0111, 1011, 1101, 1110, 0011, 1100, and 1001. Any field values other than the allowed punctured patterns are Validate. Field value may be varied from one 80 MHz to the other. If the Bandwidth field is set to 0 or 1, which indicates a 20/40 MHz PPDU, B3-B6 are set to all 1s. Other values are Validate: B7 is set to 1 and Disregard. For further information on punctured channels, refer to 36.3.12.11 (EHT preamble of preamble punctured EHT MU PPDU). |

Below shows the configuration of the Punctured Channel Information field for each BW in a non-OFDMA situation.

TABLE 6

| PPDU bandwidth | Cases | Puncturing pattern (RU or MRU Index) | Field value |
|---|---|---|---|
| 20 MHz | No puncturing | [1] (242-tone RU 1) | 0 |
| 40 MHZ | No puncturing | [1 1] (484-tone RU 1) | 0 |
| 80 MHZ | No puncturing | [1 1 1 1] (996-tone RU 1) | 0 |
| | 20 MHz puncturing | [x 1 1 1] (484 + 242-tone MRU 1) | 1 |
| | | [1 x 1 1] (484 + 242-tone MRU 2) | 2 |
| | | [1 1 x 1] (484 + 242-tone MRU 3) | 3 |
| | | [1 1 1 x] (484 + 242-tone MRU 4) | 4 |
| 160 MHZ | No puncturing | [1 1 1 1 1 1 1 1] (2 × 996-tone RU 1) | 0 |
| | 20 MHz puncturing | [x 1 1 1 1 1 1 1] (996 + 484 + 242-tone MRU 1) | 1 |
| | | [1 x 1 1 1 1 1 1] (996 + 484 + 242-tone MRU 2) | 2 |
| | | [1 1 x 1 1 1 1 1] (996 + 484 + 242-tone MRU 3) | 3 |
| | | [1 1 1 x 1 1 1 1] (996 + 484 + 242-tone MRU 4) | 4 |
| | | [1 1 1 1 x 1 1 1] | 5 |

TABLE 6-continued

| PPDU bandwidth | Cases | Puncturing pattern (RU or MRU Index) | Field value |
|---|---|---|---|
| | | (996 + 484 + 242-tone MRU 5) | |
| | | [1 1 1 1 1 x 1 1] (996 + 484 + 242-tone MRU 6) | 6 |
| | | [1 1 1 1 1 1 x 1] (996 + 484 + 242-tone MRU 7) | 7 |
| | | [1 1 1 1 1 1 1 x] (996 + 484 + 242-tone MRU 8) | 8 |
| | 40 MHz puncturing | [x x 1 1 1 1 1 1] (996 + 484-tone MRU 1) | 9 |
| | | [1 1 x x 1 1 1 1] (996 + 484-tone MRU 2) | 10 |
| | | [1 1 1 1 x x 1 1] (996 + 484-tone MRU 3) | 11 |
| | | [1 1 1 1 1 1 x x] (996 + 484-tone MRU 4) | 12 |
| 320 MHz | No puncturing | [1 1 1 1 1 1 1 1] (4 × 996-tone RU 1) | 0 |
| | 40 MHz puncturing | [x 1 1 1 1 1 1 1] (3 × 996 + 484-tone MRU 1) | 1 |
| | | [1 x 1 1 1 1 1 1] (3 × 996 + 484-tone MRU 2) | 2 |
| | | [1 1 x 1 1 1 1 1] (3 × 996 + 484-tone MRU 3) | 3 |
| | | [1 1 1 x 1 1 1 1] (3 × 996 + 484-tone MRU 4) | 4 |
| | | [1 1 1 1 x 1 1 1] (3 × 996 + 484-tone MRU 5) | 5 |
| | | [1 1 1 1 1 x 1 1] (3 × 996 + 484-tone MRU 6) | 6 |
| | | [1 1 1 1 1 1 x 1] (3 × 996 + 484-tone MRU 7) | 7 |
| | | [1 1 1 1 1 1 1 x] (3 × 996 + 484-tone MRU 8) | 8 |
| | 80 MHz puncturing | [x x 1 1 1 1 1 1] (3 × 996-tone MRU 1) | 9 |
| | | [1 1 x x 1 1 1 1] (3 × 996-tone MRU 2) | 10 |
| | | [1 1 1 1 x x 1 1] (3 × 996-tone MRU 3) | 11 |
| | | [1 1 1 1 1 1 x x] (3 × 996-tone MRU 4) | 12 |
| | Concurrent 80 MHz and 40 MHz puncturing | [x x x 1 1 1 1 1] (2 × 996 + 484-tone MRU 7) | 13 |
| | | [x x 1 x 1 1 1 1] (2 × 996 + 484-tone MRU 8) | 14 |
| | | [x x 1 1 x 1 1 1] (2 × 996 + 484-tone MRU 9) | 15 |
| | | [x x 1 1 1 x 1 1] (2 × 996 + 484-tone MRU 10) | 16 |
| | | [x x 1 1 1 1 x 1] (2 × 996 + 484-tone MRU 1 1) | 17 |
| | | [x x 1 1 1 1 1 x] (2 × 996 + 484-tone MRU 12) | 18 |
| | | [x 1 1 1 1 1 x x] (2 × 996 + 484-tone MRU 1) | 19 |
| | | [1 x 1 1 1 1 x x] (2 × 996 + 484-tone MRU 2) | 20 |
| | | [1 1 x 1 1 1 x x] (2 × 996 + 484-tone MRU 3) | 21 |
| | | [1 1 1 x 1 1 x x] (2 × 996 + 484-tone MRU 4) | 22 |
| | | [1 1 1 1 x 1 x x] (2 × 996 + 484-tone MRU 5) | 23 |
| | | [1 1 1 1 1 x x x] (2 × 996 + 484-tone MRU 6) | 24 |

Next, this specification proposes the EHT-STF sequence and the EHT-LTF sequence.

The EHT-STF sequence of the EHT MU PPDU in 160 MHz transmission is as follows.

$$EHTS_{-1008:16:1008} = \{M,\ 1,\ -M,\ 0,\ -M,\ 1,\ -M,\ 0,\ -M,\ -1,\ M,\ 0,\ -M,\ 1,\ -M\} * (1+j)/sqrt(2)$$

The EHT-STF sequence of the EHT TB PPDU in 160 MHz transmission is as follows.

$$EHTS_{-1008:8:1008} = \{M, -1, M, -1, -M, -1, M, 0, -M, 1, M, 1, -M, 1, -M, 0, -M, 1, -M, 1, M, 1, -M, 0, -M, 1, M, 1, -M, 1, -M\} * (1+j)/sqrt(2)$$

The EHT-STF sequence of the EHT MU PPDU in 320 MHz transmission is as follows.

$$EHTS_{-2032:16:2032} = \{M, 1, -M, 0, -M, 1, -M, 0, M, 1, -M, 0, -M, 1, -M, 0, -M, -1, M, 0, M, -1, M, 0, -M, -1, M, 0, M, -1, M\} * (1+j)/sqrt(2)$$

The EHT-STF sequence of the EHT TB PPDU in 320 MHZ transmission is as follows.

$$EHTS_{-2032:8:2032} = \{M, -1, M, -1, -M, -1, M, 0, -M, 1, M, 1, -M, 0, M-1, M, -1, -M, -1, M, 0, -M, 1, M, 1, -M, 1, -M, 0, -M1, -M, 1, M, 1, -M, 0, M-1, -M-1, M, -1, M, 0, -M, 1, -M, 1, M, 1, -M, 0, M, -1, -M, -1, M, -1, M\} * (1+j)/sqrt(2)$$

The M sequence is defined as follows.

$$M = \{-1, -1, -1, 1, 1, 1, -1, 1, 1, 1, -1, 1, 1, -1, 1\}$$

For 160 MHz transmission, the 1×EHT-LTF sequence is as follows:

$$EHTLTF_{-1012,1012} = \{LFT_{80MHz\_lower\_1x}, 0, 0, 0, 0, 0, 0, 0, 0, 0, 0, 0, 0, 0, 0, 0, 0, 0, 0, 0, 0, 0, 0, 0, LTF_{80MHz\_upper\_1x}\}$$

where $$LTF_{80MHz\_lower\_1x} = \{LTF_{80MHz\_left\_1x}, 0, LTF_{80MHz\_right\_1x}\}$$

shall be used in the lower 80 MHz frequency segment $$LTF_{80MHz\_upper\_1x} = \{LTF_{80MHz\_left\_1x}, 0, -LTF_{80MHz\_right\_1x}\}$$

shall be used in the lower 80 MHz frequency segment $$LTF_{80MHz\_left\_1x} = \{-1, 0, 0, 0, -1, 0, 0, 0, +1, 0, 0, 0, +1, 0, 0, 0, +1, 0, 0, 0, +1, 0, 0, 0, +1, 0, 0, 0, -1, 0, 0, 0, -1, 0, 0, 0, -1, 0, 0, 0, +1, 0, 0, 0, +1, 0, 0, 0, -1, 0, 0, 0, -1, 0, 0, 0, +1, 0, 0, 0, -1, 0, 0, 0, +1, 0, 0, 0, -1, 0, 0, 0, -1, 0, 0, 0, -1, 0, 0,$$

-continued

0, −1, 0, 0, 0, −1, 0, 0, 0, −1, 0, 0, 0, +1, 0, 0,
0, +1, 0, 0, 0, −1, 0, 0, 0, −1, 0, 0, 0, +1, 0, 0, 0,
−1, 0, 0, 0, +1, 0, 0, 0, −1, 0, 0, 0, −1, 0, 0, 0, −1, 0, 0,
0, −1, 0, 0, 0, −1, 0, 0, 0, +1, 0, 0, 0, +1, 0, 0, 0, −1, 0,
0, 0, −1, 0, 0, 0, +1, 0, 0, 0, −1, 0, 0, 0, +1, 0, 0,
0, −1, 0, 0, 0, +1, 0, 0, 0, +1, 0, 0, 0, +1, 0, 0, 0,
+1, 0, 0, 0, +1, 0, 0, 0, −1, 0, 0, 0, −1, 0, 0, 0, +1,
0, 0, 0, +1, 0, 0, 0, −1, 0, 0, 0, +1, 0, 0, 0, −1, 0, 0, 0,
+1, 0, 0, 0, −1, 0, 0, 0, −1, 0, 0, 0, −1, 0, 0, 0,
−1, 0, 0, 0, +1, 0, 0, 0, −1, 0, 0, 0, −1, 0, 0, 0, −1,
0, 0, 0, −1, 0, 0, 0, −1, 0, 0, 0, −1, 0, 0, 0, +1, 0, 0,
0, +1, 0, 0, 0, +1, 0, 0, 0, −1, 0, 0, 0, −1, 0, 0, 0, +1, 0,
0, 0, +1, 0, 0, 0, −1, 0, 0, 0, +1, 0, 0, 0, −1,
0, 0, 0, +1, 0, 0, 0, +1, 0, 0, 0, +1, 0, 0, 0, +1,
0, 0, 0, +1, 0, 0, 0, +1, 0, 0, 0, −1, 0, 0, 0, −1, 0, 0,
0, +1, 0, 0, 0, +1, 0, 0, 0, −1, 0, 0, 0, +1, 0, 0, 0, −1, 0,
0, 0, +1, 0, 0, 0, +1, 0, 0, 0, +1, 0, 0, 0,
+1, 0, 0, 0, −1, 0, 0, 0, +1, 0, 0, 0, +1, 0, 0, 0, −1,
0, 0, 0, −1, 0, 0, 0, +1, 0, 0, 0, −1, 0, 0, 0, +1, 0, 0, 0,
−1, 0, 0, 0, +1, 0, 0, 0, +1, 0, 0, 0, +1, 0, 0, 0, +1, 0, 0,
0, +1, 0, 0, 0, −1, 0, 0, 0, −1, 0, 0, 0,
+1, 0, 0, 0, +1, 0, 0, 0, −1, 0, 0, 0, +1, 0, 0, 0,
−1, 0, 0, 0, +1, 0, 0, 0, −1, 0, 0, 0, −1, 0, 0, 0, −1, 0, 0,
0, −1, 0, 0, 0, +1, 0, 0, 0, −1, 0, 0, 0, +1, 0, 0, 0,
−1, 0, 0, 0, −1, 0, 0, 0,}

$LTF_{80MHz\_right\_1x}$ =

{0, 0, 0, −1, 0, 0, 0, +1, 0, 0, 0, +1, 0, 0, 0, −1, 0, 0, 0, −1, 0, 0, 0,
+1, 0, 0, 0, +1, 0, 0, 0, −1, 0, 0, 0, −1, 0, 0, 0, +1,
0, 0, 0, +1, 0, 0, 0, −1, 0, 0, 0, +1, 0, 0, 0, 0, −1, 0, 0,
0, +1, 0, 0, 0, +1, 0, 0, 0, +1, 0, 0, 0, +1, 0, 0,
0, +1, 0, 0, 0, +1, 0, 0, 0, −1, 0, 0, 0, −1, 0, 0, 0,
+1, 0, 0, 0, +1, 0, 0, 0, −1, 0, 0, 0, +1, 0, 0, 0, −1, 0,
0, 0, +1, 0, 0, 0, +1, 0, 0, 0, +1, 0, 0, 0, +1, 0, 0, 0,
+1, 0, 0, 0, −1, 0, 0, 0, −1, 0, 0, 0, +1, 0, 0, 0,
+1, 0, 0, 0, −1, 0, 0, 0, +1, 0, 0, 0, −1, 0, 0, 0, +1,
0, 0, 0, −1, 0, 0, 0, −1, 0, 0, 0, −1, 0, 0, 0, −1, 0, 0,
0, −1, 0, 0, 0, +1, 0, 0, 0, +1, 0, 0, 0, −1, 0, 0, 0, −1,
0, 0, 0, +1, 0, 0, 0, −1, 0, 0, 0, +1, 0, 0, 0, −1,
0, 0, 0, +1, 0, 0, 0, +1, 0, 0, 0, +1, 0, 0, 0, +1,
0, 0, 0, −1, 0, 0, 0, +1, 0, 0, 0, −1, 0, 0, 0, −1, 0, 0, 0,
+1, 0, 0, 0, −1, 0, 0, 0, −1, 0, 0, 0, +1, 0, 0, 0, +1, 0,
0, 0, +1, 0, 0, 0, −1, 0, 0, 0, −1, 0, 0, 0, +1, 0,
0, 0, +1, 0, 0, 0, −1, 0, 0, 0, +1, 0, 0, 0, −1, 0, 0,
0, +1, 0, 0, 0, +1, 0, 0, 0, +1, 0, 0, 0, +1, 0, 0, 0, +1,

-continued 0, 0, 0, +1, 0, 0, 0, −1, 0, 0, 0, −1, 0, 0, 0, +1, 0, 0, 0,
+1, 0, 0, 0, −1, 0, 0, 0, +1, 0, 0, 0, −1, 0,
0, 0, +1, 0, 0, 0, +1, 0, 0, 0, +1, 0, 0, 0, +1, 0, 0,
0, −1, 0, 0, 0, +1, 0, 0, 0, +1, 0, 0, 0, −1, 0, 0, 0, −1,
0, 0, 0, +1, 0, 0, 0, −1, 0, 0, 0, +1, 0, 0, 0, −1, 0, 0, 0,
+1, 0, 0, 0, +1, 0, 0, 0, +1, 0, 0, 0, +1,
0, 0, 0, +1, 0, 0, 0, −1, 0, 0, 0, −1, 0, 0, 0, +1,
0, 0, 0, +1, 0, 0, 0, −1, 0, 0, 0, +1, 0, 0, 0, −1, 0, 0, 0,
+1, 0, 0, 0, −1, 0, 0, 0, −1, 0,
0, 0, −1, 0, 0, 0, −1, 0, 0, 0, +1, 0, 0, 0, −1, 0, 0,
0, +1, 0, 0, 0, −1, 0, 0, 0, −1, 0, 0, 0, −1, 0, 0, 0,
+1, 0, 0, 0, +1}

For 160 MHz transmission, the 2×EHT-LTF sequence is as follows:

$$HELTF_{-1012,1012} = \{LFT_{80MHz\_lower\_2x}, 0, 0, 0, 0, 0, 0, 0, 0, 0, 0, 0, 0, 0, 0, 0, 0, 0, 0, 0, 0, 0, 0, 0, LTF_{80MHz\_upper\_2x}\}$$

where $$LTF_{80MHz\_lower\_2x} = \{LTF_{80MHz\_part1\_2x}, LTF_{80MHz\_part2\_2x}, LTF_{80MHz\_part3\_2x}, LTF_{80MHz\_part4\_2x}, LTF_{80MHz\_part5\_2x}\}$$

shall be used in the lower 80 MHz frequency subblock $$LTF_{80MHz\_upper\_2x} = \{LTF_{80MHz\_part1\_2x}, -LTF_{80MHz\_part2\_2x}, LTF_{80MHz\_part3\_2x}, LTF_{80MHz\_part4\_2x}, -LTF_{80MHz\_part5\_2x}\}$$

shall be used in the upper 80 MHz frequency subblock $LTF_{80MHz\_part1\_2x}$ =

{+1, 0, +1, 0, −1, 0, +1, 0, 1, 0, +1, 0, −1, 0, +1, 0, +1, 0, +1, 0, +1,
0, −1, 0, −1, 0, −1, 0, +1, 0, −1, 0, −1, 0, +1, 0, +1, 0, −1, 0, +1, 0,
+1, 0, +1, 0, −1, 0, −1, 0, −1, 0, −1, 0, +1, 0, +1, 0, +1, 0, +1, 0,
−1, 0, +1, 0, +1, 0, +1, 0, −1, 0, +1, 0, −1, 0, −1, 0, +1, 0, −1, 0,
−1, 0, −1, 0, +1, 0, +1, 0, −1, 0, −1, 0, −1, 0, +1, 0, −1, 0, −1, 0,
+1, 0, −1, 0, +1, 0, +1, 0, −1, 0, +1, 0, +1, 0, −1, 0, +1, 0, −1, 0,
−1, 0, −1, 0, +1, 0, −1, 0, −1, 0, −1, 0, −1, 0, +1, 0, −1, 0, −1, 0,
+1, 0, +1, 0, −1, 0, +1, 0, +1, 0, +1, 0, −1, 0, −1, 0, −1, 0, −1, 0,
+1, 0, −1, 0, +1, 0, +1, 0, +1, 0, −1, 0, +1, 0, +1, 0, +1, 0, +1, 0,
−1, 0, −1, 0, −1, 0, +1, 0, +1, 0, +1, 0, −1, 0, −1, 0, +1, 0, +1, 0,
+1, 0, −1, 0, +1, 0, +1, 0, −1, 0, +1, 0, −1, 0, −1, 0, −1, 0, −1, 0,
+1, 0, −1, 0, −1, 0, −1, 0, +1, 0, −1, 0, +1, 0, +1, 0, −1, 0, +1, 0}

$LTF_{80MHz\_part2\_2x}$ =

{+1, 0, −1, 0, −1, 0, −1, 0, +1, 0, −1, 0, −1, 0, −1, 0, +1, 0, −1, 0, +1,
0, +1, 0, −1, 0, +1, 0, +1, 0, +1, 0, −1, 0, −1, 0, +1, 0, +1, 0, +1, 0,
−1, 0, +1, 0, +1, 0, −1, 0, +1, 0, −1, 0, −1, 0, +1, 0, −1, 0, +1, 0,
+1, 0, +1, 0, −1, 0, +1, 0, +1, 0, +1, 0, +1, 0, −1, 0, −1, 0, −1, 0,
+1, 0, −1, 0, −1, 0, +1, 0, +1, 0, −1, 0, +1, 0, +1, 0, +1, 0, −1, 0,

-continued

−1, 0, −1, 0, −1, 0, +1, 0, +1, 0, +1, 0, −1, 0, −1, 0, −1, 0, −1, 0,
+1, 0, −1, 0, −1, 0, −1, 0, +1, 0, −1, 0, +1, 0, +1, 0, +1, 0, −1, 0,
−1, 0, +1, 0, +1, 0, +1, 0, −1, 0, +1, 0, +1, 0, −1, 0, +1, 0, −1, 0,
−1, 0, −1, 0, −1, 0, +1, 0, −1, 0, −1, 0, −1, 0, +1, 0, −1, 0, +1, 0,
+1, 0, −1, 0, +1, 0, +1, 0, −1, 0, +1, 0, +1, 0, −1, 0, −1, 0, +1, 0,
−1, 0, −1, 0, −1, 0, +1, 0, +1, 0, +1, 0, +1, 0, −1, 0, +1, 0, −1, 0,
−1, 0, −1, 0, +1, 0, −1, 0, −1, 0, −1, 0, −1, 0, +1, 0, +1, 0, +1, 0}

$LTF_{80MHz\_part3\_2x}$ = {+1, 0, −1, 0, −1, 0, −1, 0, +1, 0, +1, 0, +1,
0, 0, 0, 0, 0, 0, 0, +1, 0, −1, 0, −1, 0, +1, 0, +1, 0, −1, 0, +1}

$LTF_{80MHz\_part4\_2x}$ =
{0, −1, 0, −1, 0, −1, 0, +1, 0, +1, 0, +1, 0, +1, 0, −1, 0, +1, 0, +1, 0,
+1, 0, −1, 0, +1, 0, −1, 0, −1, 0, −1, 0, −1, 0, +1, 0, +1, 0, +1, 0, −1,
0, +1, 0, +1, 0, −1, 0, −1, 0, +1, 0, −1, 0, −1, 0, +1, 0, −1, 0, −1,
0, +1, 0, −1, 0, +1, 0, +1, 0, +1, 0, −1, 0, +1, 0, +1, 0, +1, 0, +1,
0, −1, 0, +1, 0, −1, 0, −1, 0, +1, 0, −1, 0, −1, 0, −1, 0, +1, 0, +1,
0, −1, 0, −1, 0, −1, 0, +1, 0, −1, 0, +1, 0, +1, 0, +1, 0, −1, 0, +1,
0, +1, 0, +1, 0, +1, 0, −1, 0, −1, 0, −1, 0, +1, 0, +1, 0, +1, 0, +1,
0, −1, 0, −1, 0, −1, 0, +1, 0, −1, 0, −1, 0, +1, 0, +1, 0, −1, 0, +1,
0, +1, 0, +1, 0, −1, 0, −1, 0, −1, 0, −1, 0, +1, 0, −1, 0, −1, 0, −1,
0, +1, 0, −1, 0, +1, 0, +1, 0, −1, 0, +1, 0, −1, 0, −1, 0, +1, 0, −1,
0, −1, 0, −1, 0, +1, 0, +1, 0, −1, 0, −1, 0, −1, 0, +1, 0, −1, 0, −1,
0, +1, 0, −1, 0, +1, 0, +1, 0, +1, 0, −1, 0, +1, 0, +1, 0, +1, 0, −1}

$LTF_{80MHz\_part5\_2x}$ =
{0, +1, 0, −1, 0, +1, 0, +1, 0, −1, 0, +1, 0, −1, 0, −1, 0, −1, 0, +1, 0,
−1, 0, −1, 0, −1, 0, −1, 0, +1, 0, −1, 0, +1, 0, +1, 0, −1, 0, +1, 0, +1,
0, +1, 0, −1, 0, −1, 0, +1, 0, +1, 0, +1, 0, −1, 0, −1, 0, −1, 0, +1,
0, +1, 0, +1, 0, +1, 0, −1, 0, +1, 0, +1, 0, +1, 0, −1, 0, +1, 0, −1,
0, −1, 0, −1, 0, −1, 0, +1, 0, +1, 0, +1, 0, −1, 0, +1, 0, +1, 0, −1,
0, −1, 0, +1, 0, −1, 0, −1, 0, −1, 0, −1, 0, +1, 0, −1, 0, −1, 0, −1,
0, +1, 0, −1, 0, +1, 0, +1, 0, −1, 0, +1, 0, +1, 0, −1, 0, +1, 0, −1,
0, −1, 0, +1, 0, −1, 0, −1, 0, −1, 0, +1, 0, +1, 0, −1, 0, −1, 0, −1,
0, +1, 0, −1, 0, −1, 0, +1, 0, −1, 0, +1, 0, +1, 0, +1, 0, −1, 0, +1,
0, +1, 0, +1, 0, +1, 0, −1, 0, −1, 0, −1, 0, −1, 0, +1, 0, +1, 0, +1,
0, −1, 0, +1, 0, +1, 0, −1, 0, −1, 0, +1, 0, −1, 0, −1, 0, −1, 0, +1,
0, +1, 0, +1, 0, +1, 0, −1, 0, +1, 0, +1, 0, +1, 0, −1, 0, +1, 0, +1}

For 160 MHz transmission, the 4×EHT-LTF sequence is as follows:

$$HELTF_{-1012,1012} = \{LTF_{80MHz\ lower\ 4x}, 0, 0, 0, 0, 0, 0, 0, 0, 0, 0, 0, 0, 0, 0, 0, 0, 0, 0, 0, 0, 0, 0, 0, LTF_{80MHz\_upper\_4x}\}$$

where $$LTF_{80MHz\_lower\_4x} = \{LTF_{80MHz\_left\_4x}, 0, LTF_{80MHz\_right\_4x}\}$$

shall be used in the lower 80 MHz frequency segment

-continued $$LTF_{80MHz\_upper\_4x} = \{LTF_{80MHz\_left\_4x}, 0, -LTF_{80MHz\_right\_4x}\}$$

shall be used in the upper 80 MHz frequency segment $LTF_{80MHz\_left\_4x}$ =
{+1, +1, −1, +1, −1, +1, −1, −1, −1, +1, −1, −1, −1, +1, +1, −1, +1,
+1, +1, +1, +1, −1, −1, +1, +1, +1, +1, −1, +1, −1, +1, −1, −1, +1,
+1, −1, +1, +1, +1, −1, −1, +1, −1, −1, −1, −1, +1, +1, +1, −1, −1,
−1, −1, −1, −1, +1, +1, +1, +1, +1, +1, −1, +1, +1, +1, −1, +1,
+1, −1, −1, −1, +1, −1, +1, −1, −1, +1, +1, −1, +1, −1, +1, +1,
+1, +1, +1, −1, −1, +1, +1, +1, −1, +1, +1, −1, −1, −1, +1, −1,
+1, +1, −1, +1, +1, −1, +1, −1, −1, +1, +1, +1, +1, −1, −1, +1,
+1, +1, +1, +1, −1, +1, +1, −1, −1, −1, +1, −1, −1, −1, +1, −1,
+1, −1, +1, +1, −1, +1, −1, +1, −1, +1, +1, +1, −1, +1, +1, +1,
−1, −1, +1, −1, −1, −1, −1, −1, +1, +1, −1, −1, −1, −1, +1, −1,
+1, −1, +1, +1, −1, −1, +1, −1, −1, −1, +1, +1, −1, +1, +1, +1,
+1, −1, −1, −1, +1, +1, +1, +1, −1, +1, +1, +1, +1, +1, +1, +1,
−1, +1, +1, +1, −1, +1, +1, −1, −1, −1, +1, −1, +1, −1, −1, +1,
+1, −1, +1, −1, +1, +1, +1, +1, +1, −1, −1, +1, +1, +1, −1, +1,
+1, −1, −1, −1, +1, −1, +1, +1, −1, +1, +1, −1, +1, −1, −1, +1,
−1, +1, −1, +1, −1, +1, +1, +1, −1, +1, +1, +1, −1, −1, +1, −1,
−1, −1, −1, −1, +1, +1, −1, −1, −1, −1, +1, −1, +1, −1, +1, +1,
−1, −1, +1, −1, −1, −1, +1, +1, −1, +1, +1, +1, +1, −1, −1, −1,
+1, +1, +1, +1, −1, +1, −1, −1, −1, −1, −1, −1, +1, −1, −1, −1,
+1, −1, −1, +1, +1, +1, −1, +1, −1, +1, +1, −1, −1, +1, −1, +1,
−1, −1, −1, −1, −1, +1, +1, −1, −1, −1, +1, −1, −1, +1, +1, +1,
−1, +1, −1, −1, +1, −1, −1, +1, −1, +1, +1, +1, +1, +1, +1, −1,
−1, +1, +1, +1, +1, +1, −1, +1, +1, −1, −1, −1, +1, −1, −1, −1,
+1, −1, +1, −1, +1, +1, −1, +1, −1, +1, −1, +1, +1, +1, −1, +1,
+1, +1, −1, −1, +1, −1, −1, −1, −1, −1, +1, +1, −1, −1, −1, −1,
+1, −1, +1, −1, +1, +1, −1, −1, +1, −1, −1, −1, +1, +1, −1, +1,
+1, +1, +1, −1, −1, −1, +1, +1, +1, +1, −1, −1, +1, +1, +1, +1,
+1, +1, −1, +1, +1, +1, −1, +1, +1, −1, −1, −1, +1, −1, +1, −1,
−1, +1, +1, −1, +1, −1, +1, +1, +1, +1, +1, −1, −1, +1, +1, +1,
−1, +1, +1, −1, −1, −1, +1, −1, +1, +1, −1, +1, +1, −1, +1, −1,
−1, −1, +1, −1, +1, −1, −1, −1, −1, +1, +1, +1, −1, −1, +1, 0, 0}

$LTF_{80MHz\_right\_4x}$ =
{0, 0, +1, −1, −1, −1, −1, −1, −1, +1, −1, +1, +1, −1, −1, +1, +1, −1,
+1, −1, +1, +1, −1, −1, +1, −1, +1, −1, −1, −1, +1, +1, −1, +1, +1,
+1, −1, +1, +1, +1, +1, +1, +1, +1, −1, +1, −1, −1, +1, −1, −1, +1,
−1, +1, +1, +1, −1, −1, +1, −1, −1, −1, +1, +1, −1, −1, −1, −1,
−1, +1, −1, −1, −1, −1, −1, +1, +1, −1, −1, −1, −1, −1, +1, −1,
−1, +1, +1, +1, −1, +1, +1, +1, −1, +1, −1, +1, −1, −1, −1, −1,
−1, +1, +1, +1, −1, −1, −1, −1, +1, −1, −1, +1, +1, +1, −1, +1,
+1, −1, −1, +1, −1, +1, −1, −1, −1, −1, −1, −1, −1, +1, +1, −1, -continued −1, −1, +1, −1, −1, +1, +1, +1, −1, +1, −1, −1, +1, −1, −1, +1,
−1, +1, +1, +1, −1, +1, −1, −1, +1, +1, −1, +1, −1, +1, +1, +1,
−1, −1, +1, −1, −1, −1, +1, −1, −1, −1, −1, −1, −1, −1, +1, −1,
+1, +1, −1, +1, +1, −1, +1, −1, −1, −1, +1, +1, −1, +1, +1, +1,
−1, −1, +1, +1, +1, +1, +1, −1, +1, −1, −1, −1, −1, +1, +1, −1,
−1, −1, −1, −1, +1, −1, −1, +1, +1, +1, −1, +1, +1, +1, −1, +1,
−1, +1, −1, −1, −1, −1, −1, +1, +1, +1, −1, −1, −1, −1, +1, −1,
−1, +1, +1, +1, −1, +1, +1, −1, −1, +1, −1, +1, −1, +1, +1, +1,
−1, +1, −1, −1, +1, +1, −1, +1, −1, +1, +1, +1, −1, −1, +1, −1,
−1, −1, +1, −1, −1, −1, −1, −1, −1, −1, +1, −1, +1, +1, −1, +1,
+1, −1, +1, −1, −1, −1, +1, +1, −1, +1, +1, +1, −1, −1, +1, +1,
+1, +1, +1, −1, +1, +1, +1, +1, +1, −1, −1, +1, +1, +1, +1, +1,
−1, +1, +1, −1, −1, −1, +1, −1, −1, −1, +1, −1, +1, −1, +1, +1,
+1, +1, +1, −1, −1, −1, +1, +1, +1, +1, −1, +1, +1, −1, −1, −1,
+1, −1, −1, +1, +1, −1, +1, −1, +1, −1, −1, −1, −1, −1, −1, +1,
+1, −1, −1, −1, +1, −1, −1, +1, +1, +1, −1, +1, −1, −1, +1, −1,
−1, +1, −1, +1, −1, +1, −1, +1, −1, −1, +1, +1, −1, +1, −1, +1,
+1, +1, −1, −1, +1, −1, −1, −1, +1, −1, −1, −1, −1, −1, −1, −1,
+1, −1, +1, +1, −1, +1, +1, −1, +1, −1, −1, −1, +1, +1, −1, +1,
+1, +1, −1, −1, +1, +1, +1, +1, +1, −1, +1, −1, −1, −1, −1, +1,
+1, −1, −1, −1, −1, −1, +1, −1, −1, +1, +1, +1, −1, +1, +1, +1,
−1, +1, −1, +1, −1, −1, −1, −1, −1, +1, +1, +1, −1, −1, −1, −1,
+1, −1, −1, +1, +1, +1, −1, +1, +1, −1, −1, +1, −1, +1, −1, +1}

For 320 MHz transmission, the 1×EHT-LTF sequence is as follows:

$$EHTLTF_{-2036,2036} = \{LTF_{80MHz\_1st\_1x}, 0_{23}, LTF_{80MHz\_2nd\_1x}, 0_{23}, LTF_{80MHz\_3rd\_1x}, 0_{23}, LTF_{80MHz\_4th\_1x}\}$$

where $0_{23}$ means 23 consecutive 0s.

$$LTF_{80MHz\_1st\_1x} = \{LTF_{80MHz\_left\_1x}, 0, LTF_{80MHz\_right\_1x}\}$$

$$LTF_{80MHz\_2nd\_1x} = \{LTF_{80MHz\_left\_1x}, 0, LTF_{80MHz\_right\_1x}\}$$

$$LTF_{80MHz\_3rd\_1x} = \{-LTF_{80MHz\_left\_1x}, 0, -LTF_{80MHz\_right\_1x}\}$$

$$LTF_{80MHz\_4th\_1x} = \{LTF_{80MHz\_left\_1x}, 0, LTF_{80MHz\_right\_1x}\}$$

For 320 MHz transmission, the 2×EHT-LTF sequence is as follows:

$$EHTLTF_{-2036,2036} = \{LTF_{80MHz\_2x}(1:245), LTF_{80MHz\_2x}(246:500), 0, LTF_{80MHz\_2x}(502:756), LTF_{80MHz\_2x}(757:1001), 0_{23}, LTF_{80MHz\_2x}(1:245), -LTF_{80MHz\_2x}(246:500), 0, LTF_{80MHz\_2x}(502:756), -LTF_{80MHz\_2x}(757:1001), 0_{23}, LTF_{80MHz\_2x}(1:245), -LTF_{80MHz\_2x}(246:500), 0, -LTF_{80MHz\_2x}(502:756),$$

-continued $$LTF_{80MHz\_2x}(757:1001), 0_{23}, LTF_{80MHz\_2x}(1:245), LTF_{80MHz\_2x}(246:500), 0, -LTF_{80MHz\_2x}(502:756), -LTF_{80MHz\_2x}(757:1001)\}$$

where $LTF_{80MHz\_2x}$ =

[+1, 0, +1, 0, +1, −1, 0, −1, 0, +1, 0, −1, 0, +1, 0, +1, 0,
+1, 0, +1, 0, −1, 0, +1, 0, −1, 0, +1, 0, +1, 0, −1, 0, −1, 0, +1, 0, −1,
0, −1, 0, −1, 0, −1, 0, −1, 0, +1, 0, −1, 0, +1, 0, −1, 0, +1, 0, +1, 0,
−1, 0, −1, 0, +1, 0, −1, 0, +1, 0, +1, 0, +1, 0, +1, 0, −1, 0, +1, 0, −1,
0, −1, 0, −1, 0, +1, 0, +1, 0, −1, 0, +1, 0, +1, 0, +1, 0, +1, 0, +1, 0,
−1, 0, +1, 0, −1, 0, −1, 0, −1, 0, −1, 0, −1, 0, +1, 0, +1, 0, −1, 0, +1,
0, +1, 0, −1, 0, −1, 0, +1, 0, +1, 0, +1, 0, −1, 0, −1, 0, +1, 0, +1,
0, −1, 0, +1, 0, −1, 0, −1, 0, −1, 0, −1, 0, +1, 0, −1, 0, +1, 0, −1,
0, −1, 0, +1, 0, +1, 0, −1, 0, +1, 0, +1, 0, +1, 0, +1, 0, +1, 0, −1,
0, +1, 0, −1, 0, −1, 0, +1, 0, +1, 0, −1, 0, −1, 0, +1, 0, −1, 0, +1,
0, +1, 0, +1, 0, +1, 0, −1, 0, +1, 0, −1, 0, −1, 0, −1, 0, +1, 0, +1,
0, −1, 0, +1, 0, +1, 0, +1, 0, +1, 0, +1, 0, +1, 0, −1, 0, +1, 0, −1,
0, −1, 0, −1, 0, +1, 0, +1, 0, +1, 0, +1, 0, −1, 0, −1, 0, +1, 0, −1, 0,
+1, 0, +1, 0, +1, 0, +1, 0, −1, 0, +1, 0, +1, 0, +1, 0, +1, 0, −1, 0,
−1, 0, +1, 0, −1, 0, −1, 0, −1, 0, −1, 0, −1, 0, +1, 0, −1, 0, +1, 0,
+1, 0, +1, 0, +1, 0, −1, 0, −1, 0, +1, 0, −1, 0, +1, 0, +1, 0, +1, 0, +1,
0, −1, 0, +1, 0, −1, 0, −1, 0, −1, 0, +1, 0, +1, 0, −1, 0, +1, 0, +1, 0,
+1, 0, +1, 0, +1, 0, −1, 0, +1, 0, −1, 0, +1, 0, +1, 0, +1, 0, −1, 0,
+1, 0, −1, 0, +1, 0, +1, 0, +1, 0, −1, 0, −1, 0, +1, 0, −1, 0, +1, 0,
+1, 0, +1, 0, −1, 0, −1, 0, +1, 0, −1, 0, +1, 0, +1, 0, +1, 0, +1, 0,
−1, 0, +1, 0, +1, 0, +1, 0, +1, 0, −1, 0, −1, 0, +1, 0, −1, 0, −1, 0,
−1, 0, −1, 0, −1, 0, +1, 0, −1, 0, +1, 0, −1, 0, −1, 0, −1, 0, +1, 0,
+1, 0, −1, 0, +1, 0, −1, 0, −1, 0, −1, 0, −1, 0, +1, 0, −1, 0, +1, 0,
+1, 0, +1, 0, −1, 0, −1, 0, +1, 0, −1, 0, −1, 0, −1, 0, −1, 0, −1, 0,
+1, 0, −1, 0, +1, 0, +1, 0, −1, 0, −1, 0, +1, 0, 0, 0, 0, 0, 0, 0, −1, 0,
−1, 0, −1, 0, −1, 0, −1, 0, −1, 0, −1, 0, +1, 0, +1, 0, −1, 0, +1, 0,
−1, 0, −1, 0, −1, 0, −1, 0, +1, 0, −1, 0, +1, 0, −1, 0, −1, 0, +1, 0,
+1, 0, −1, 0, +1, 0, +1, 0, +1, 0, +1, 0, +1, 0, −1, 0, +1, 0, −1, 0,
+1, 0, −1, 0, −1, 0, +1, 0, +1, 0, −1, 0, +1, 0, −1, 0, −1, 0, −1, 0,
−1, 0, +1, 0, −1, 0, +1, 0, +1, 0, +1, 0, −1, 0, −1, 0, +1, 0, −1, 0,
−1, 0, −1, 0, −1, 0, −1, 0, +1, 0, −1, 0, +1, 0, −1, 0, −1, 0, −1, 0,
−1, 0, −1, 0, −1, 0, −1, 0, −1, 0, +1, 0, −1, 0, +1, 0, +1, 0, −1, 0,
−1, 0, +1, 0, +1, 0, −1, 0, −1, 0, −1, 0, +1, 0, +1, 0, −1, 0, +1, 0,
−1, 0, −1, 0, −1, 0, −1, 0, +1, 0, −1, 0, +1, 0, −1, 0, −1, 0, +1, 0,
+1, 0, −1, 0, +1, 0, +1, 0, +1, 0, +1, 0, +1, 0, −1, 0, +1, 0, −1, 0,
−1, 0, +1, 0, +1, 0, −1, 0, −1, 0, +1, 0, −1, 0, +1, 0, +1, 0, +1, 0,
+1, 0, −1, 0, +1, 0, −1, 0, −1, 0, −1, 0, +1, 0, +1, 0, −1, 0, +1, 0,
+1, 0, +1, 0, +1, 0, +1, 0, −1, 0, +1, 0, −1, 0, +1, 0, +1, 0, +1, 0,
+1, 0, +1, 0, +1, 0, −1, 0, −1, 0, +1, 0, −1, 0, +1, 0, +1, 0, +1, 0,

-continued $$
\begin{gathered}
+1, 0, -1, 0, +1, 0, +1, 0, +1, 0, +1, 0, -1, 0, -1, 0, +1, 0, -1, 0, \\
-1, 0, -1, 0, -1, 0, -1, 0, +1, 0, -1, 0, +1, 0, +1, 0, +1, 0, +1, 0, \\
-1, 0, -1, 0, +1, 0, -1, 0, +1, 0, +1, 0, +1, 0, +1, 0, -1, 0, +1, 0, \\
-1, 0, -1, 0, -1, 0, +1, 0, +1, 0, -1, 0, +1, 0, +1, 0, +1, 0, +1, 0, \\
+1, 0, -1, 0, +1, 0, -1, 0, +1, 0, +1, 0, -1, 0, -1, 0, +1, 0, +1, 0, \\
+1, 0, -1, 0, -1, 0, -1, 0, +1, 0, -1, 0, +1, 0, -1, 0, -1, 0, -1, 0, \\
+1, 0, +1, 0, -1, 0, +1, 0, -1, 0, -1, 0, -1, 0, -1, 0, +1, 0, -1, 0, \\
-1, 0, -1, 0, -1, 0, +1, 0, +1, 0, -1, 0, +1, 0, +1, 0, +1, 0, +1, 0, \\
+1, 0, -1, 0, +1, 0, +1, 0, +1, 0, +1, 0, +1, 0, -1, 0, -1, 0, +1, 0, \\
-1, 0, +1, 0, +1, 0, +1, 0, +1, 0, -1, 0, +1, , -1, 0, -1, 0, -1, 0, +1, \\
0, +1, 0, -1, 0, +1, 0, +1, 0, +1, 0, +1, 0, +1, 0, -1, 0, +1, 0, +1].
\end{gathered}
$$

$0_{23}$ means 23 consecutive $0s$.

For 320 MHz transmission, the 4×EHT-LTF sequence is as follows:

$$
\begin{gathered}
EHTLTF_{-2036,2036} = \{LTF_{80MHz\_subblock\_left\_4x}, 0_5, LTF_{80MHz\_subblock\_right\_4x}, \\
0_{23}, LTF_{80MHz\_subblock\_left\_4x}, 0_5, -LTF_{80MHz\_subblock\_right\_4x}, \\
0_{23}, -LTF_{80MHz\_subblock\_left\_4x}, 0_5, -LTF_{80MHz\_subblock\_right\_4x}, \\
0_{23}, -LTF_{80MHz\_subblock\_left\_4x}, 0_5, LTF_{80MHz\_subblock\_right\_4x}\}
\end{gathered}
$$

where $$
\begin{gathered}
LTF_{80MHz\_subblock\_left\ 4x} = \\
[+1, -1, -1, -1, -1, +1, -1, -1, +1, -1, \\
-1, -1, +1, +1, -1, -1, -1, +1, -1, -1, +1, -1, +1, +1, +1, -1, \\
+1, -1, +1, -1, -1, -1, -1, +1, +1, +1, +1, +1, -1, -1, +1, -1, \\
+1, -1, -1, -1, +1, +1, -1, -1, +1, -1, -1, -1, +1, +1, +1, -1, \\
-1, +1, +1, -1, -1, +1, -1, +1, +1, -1, +1, -1, +1, +1, +1, -1, \\
+1, -1, +1, +1, +1, +1, +1, +1, -1, -1, -1, +1, -1, +1, -1, -1, \\
-1, +1, -1, -1, +1, +1, +1, +1, +1, +1, -1, +1, -1, +1, +1, -1, \\
+1, -1, +1, -1, +1, -1, +1, -1, -1, +1, +1, +1, +1, -1, -1, -1, \\
-1, -1, -1, -1, -1, +1, -1, -1, +1, -1, -1, +1, +1, +1, -1, +1, \\
-1, -1, -1, +1, +1, +1, -1, +1, +1, -1, -1, +1, -1, -1, -1, +1, \\
+1, +1, +1, -1, +1, +1, +1, +1, +1, +1, -1, +1, -1, -1, +1, -1, \\
+1, -1, -1, +1, +1, +1, +1, +1, -1, +1, +1, -1, -1, +1, +1, +1, \\
-1, +1, +1, -1, +1, +1, -1, -1, +1, +1, -1, -1, -1, -1, +1, +1, \\
+1, +1, +1, -1, +1, +1, +1, +1, +1, -1, +1, -1, +1, -1, -1, +1, \\
-1, -1, -1, -1, -1, +1, -1, -1, -1, +1, +1, -1, +1, -1, +1, -1, \\
-1, -1, -1, -1, +1, +1, +1, +1, -1, +1, -1, -1, +1, +1, -1, -1, \\
-1, +1, +1, +1, +1, +1, -1, +1, -1, +1, -1, -1, +1, +1, +1, -1, \\
+1, +1, +1, +1, +1, -1, +1, +1, -1, +1, -1, +1, -1, -1, -1, -1, \\
-1, +1, -1, -1, -1, -1, -1, +1, +1, +1, +1, -1, -1, +1, +1, -1, \\
-1, +1, -1, -1, +1, -1, -1, -1, +1, +1, -1, -1, +1, -1, -1, -1, \\
-1, -1, +1, +1, -1, +1, -1, +1, +1, -1, +1, -1, -1, -1, -1, -1, \\
-1, +1, -1, -1, -1, -1, +1, +1, +1, -1, +1, +1, -1, -1, +1, -1, \\
-1, -1, +1, +1, +1, -1, +1, -1, +1, -1, -1, -1, +1, -1, +1, -1, \\
+1, -1, -1, -1, +1, -1, -1, +1, -1, +1, +1, -1, -1, -1, +1, +1, \\
-1, -1, -1, -1, +1, -1, +1, +1, -1, +1, -1, +1, +1, +1, +1, +1, \\
+1, -1, -1, +1, -1, -1, -1, +1, -1, +1, -1, -1, -1, +1, +1, +1, \\
+1, +1, +1, -1, +1, -1, +1, +1, +1, -1, +1, -1, +1, +1, -1, +1, \\
-1, -1, +1, +1, -1, -1, +1, +1, +1, -1, -1, -1, +1, -1, -1, +1, \\
+1, +1, -1, -1, +1, -1, -1, -1, +1, +1, -1, -1, -1, +1, -1, \\
-1, +1, -1, -1, -1, -1, +1, -1, +1, +1, -1, -1, +1, -1, -1].
\end{gathered}
$$

$$
\begin{gathered}
LTF_{80MHz\_subblock\_right\_4x} = \\
[-1, -1, +1, -1, +1, +1, +1, +1, +1, \\
+1, -1, -1, -1, -1, +1, -1, -1, +1, -1, -1, -1, +1, +1, -1, -1, \\
-1, +1, -1, -1, +1, -1, +1, +1, +1, -1, +1, -1, +1, -1, -1, -1, \\
-1, +1, +1 + 1, +1, +1, -1, -1, +1, -1, +1, -1, -1, -1, +1, +1, \\
-1, -1, +1, -1, -1, -1, +1, +1, +1, -1, -1, +1, +1, -1, -1, +1, \\
-1, +1, +1, -1, +1, -1, +1, +1, +1, -1, +1, -1, +1, +1, +1, +1, \\
+1, +1, -1, -1, -1, +1, -1, +1, -1, -1, -1, +1, -1, -1, +1, +1, \\
+1, +1, +1, +1, -1, +1, -1, +1, +1, -1, +1, -1, -1, -1, -1, +1, \\
+1, -1, -1, -1, +1, +1, -1, +1, -1, -1, +1, -1, -1, -1, +1, \\
-1, +1, -1, +1, -1, -1, -1, +1, -1, +1, -1, +1, +1, +1, -1, \\
-, -1, +1, -1, -1, +1, +1, -1, +1, +1, +1, -1, -1, -1, -1, +1, -1, \\
-1, -1, -1, -1, -1, +1, -1, +1, +1, -1, +1, -1, +1, +1, -1, -1, -1, \\
-1, -1, +1, -1, -1, +1, +1, -1, -1, -1, +1, -1, -1, +1, -1, -1, +1, \\
+1, -1, -1, +1, +1, +1, +1, -1, -1, -1, -1, -1, +1, -1, -1, -1, -1, \\
-1, +1, -1, +1, -1, +1, +1, -1, +1, +1, +1, +1, +1, -1, +1, +1, +1, \\
-1, -1, +1, -1, +1, -1, +1, +1, +1, +1, +1, -1, -1, -1, +1, +1, -1, \\
-1, -1, -1, -1, -1, -1, -1, +1, +1, +1, +1, +1, -1, +1, -1, +1, -1, \\
-1, +1, +1, +1, -1, +1, +1, +1, +1, +1, -1, +1, +1, -1, +1, -1, +1, \\
-1, -1, -1, -1, -1, +1, -1, -1, -1, -1, -1, +1, +1, +1, +1, -1, -1, \\
+1, +1, -1, -1, +1, -1, -1, +1, -1, -1, -1, +1, +1, -1, -1, +1, -1, \\
-1, -1, -1, -1, +1, +1, -1, +1, -1, +1, +1, -1, +1, -1, -1, -1, -1, \\
-1, -1, +1, -1, -1, -1, -1, +1, +1, +1, -1, +1, +1, -1, -1, +1, \\
-1, -1, -1, +1, +1, +1, -1, +1, -1, -1, -1, +1, +1, -1, +1, +1, \\
-1, +1, +1, +1, +1, +1, +1, +1, +1, -1, -1, -1, -1, +1, +1, -1, \\
+1, -1, +1, -1, +1, -1, +1, -1, -1, +1, -1, +1, -1, -1, -1, -1, \\
-1, -1, +1, +1, -1, +1, +1, +1, -1, +1, -1, +1, +1, +1, -1, -1, \\
-1, -1, -1, -1, +1, -1, +1, -1, -1, -1, +1, -1, +1, -1, -1, +1, \\
-1, +1, +1, -1, -1, +1, +1, -1, -1, -1, +1, +1, +1, -1, +1, +1, \\
-1, -1, +1, +1, +1, -1, +1, -1, +1, +1, -1, -1, -1, -1, -1, +1, \\
+1, +1, +1, -1, +1, -1, +1, -1, -1, -1, +1, -1, +1, +1, -1, +1, \\
+1, +1, -1, -1, +1, +1, +1, -1, +1, +1, -1, +1, +1, +1, +1, -1].
\end{gathered}
$$

$0_5$ means 5 consecutive $0s$.

$0_{23}$ means 23 consecutive $0s$.

In A-PPDU transmitted as a combination of HE PPDU and EHT PPDU, Primary 160 MHz is set according to the indication of the bandwidth of HE PPDU. Below, this specification proposes a method for applying sequence and preamble puncturing to the secondary 160 MHz of A-PPDU, which is a combination of HE PPDU and EHT PPDU, and a method for applying sequence and preamble puncturing to Primary/Secondary 160 MHz of one EHT PPDU, rather than A-PPDU and A-PPDU, which are a combination of EHT PPDUs.

1.1 Example of Using Sequence and Preamble Puncturing According to Bandwidth Indication Depending on the bandwidth indicated in the EHT PPDU of each PPDU type, a method for applying a sequence defined in the corresponding bandwidth and indicating preamble puncturing can be used. That is, in A-PPDU (a combination of HE PPDU and EHT PPDU or only EHT PPDU), the method of applying sequence and preamble puncturing is set according to the bandwidth indicated in each sub EHT PPDU. When transmitted as one EHT PPDU rather than an A-PPDU, the sequence is set according to the indicated bandwidth, and the method defined in the corresponding bandwidth is also used to indicate preamble puncturing.

For example, in the case of A-PPDU that is a combination of HE PPDU and EHT PPDU, if the bandwidth of EHT PPDU is indicated as 160 MHz in Secondary 160 MHz, for the EHT PPDU, a method for applying a 160 MHz sequence and instructing preamble puncturing defined at 160 MHz can be used. If the bandwidth of the EHT PPDU is indicated as 320 MHz, a method of indicating the preamble puncturing pattern of the entire A-PPDU can be used by applying the sequence corresponding to the secondary 160 MHz in the 320 MHz sequence and indicating preamble puncturing defined at 320 MHz. Additionally, if the bandwidth of the EHT PPDU is indicated as 80 MHZ, a method for applying an 80 MHz sequence to the EHT PPDU and indicating preamble puncturing defined at 80 MHz is used.

In the above-mentioned method, since the method for indicating sequence setting and preamble puncturing is always determined according to the indicated bandwidth, the method for indicating the same sequence and the same preamble puncturing in all PPDU types cannot be expected, which may be undesirable in implementation.

1.2. Example of Using the Method of Always Applying 320 MHz Sequence and Preamble Puncturing Regardless of PPDU type and bandwidth indication, the AP can always configure Primary/Secondary 160 MHz sequences based on the 320 MHz sequence. In other words, the sequence corresponding to Primary/Secondary 160 MHz among the 320 MHz sequence is used. Additionally, the preamble puncturing pattern of the entire A-PPDU can be indicated by applying the method of indicating 320 MHz preamble puncturing. Since this configures the sequence according to the assigned position and always indicates the entire 320 MHz preamble puncturing pattern, it can be expected to indicate the same sequence and preamble puncturing in all PPDU types, which may be desirable in implementation. However, if the bandwidth of the EHT PPDU being transmitted in Primary/Secondary 160 MHz is indicated as 160 MHz and there is no specific A-PPDU indicator in A-PPDU (a combination of HE PPDU and EHT PPDU or only EHT PPDU), an error may occur when an OBSS (Overlapping Basic Service Sets) EHT STA, STA with an unassociated EHT STA, or an EHT the dot11EHTBaseLineFeatureImplementedOnly parameter set to true decodes an EHT PPDU being transmitted in the corresponding Primary/Secondary 160 MHz. Therefore, to prepare for this case, it may be desirable to include an A-PPDU indicator in addition to indicating 320 MHz or 160 MHz in the EHT PPDU being transmitted at Primary/Secondary 160 MHz in the A-PPDU.

1.3. Example of Using the Method of Always Applying 160 MHz Sequence and Preamble Puncturing Regardless of the PPDU type and bandwidth indication, the Primary/Secondary 160 MHz sequence can always be configured based on the 160 MHz sequence. In other words, among the 160 MHz sequence, the sequence corresponding to each 80 MHz within the Primary/Secondary 160 MHz is used. In addition, based on the method for indicating 160 MHz preamble puncturing, the preamble puncturing pattern of the 160 MHz channel where the corresponding EHT PPDU is located can be indicated. Also, when SST is applied, a method for applying the same sequence and preamble puncturing is used in all 160 MHz channels, so a method for applying the same sequence and preamble puncturing to all PPDU types can be expected, which may be desirable in implementation. However, in A-PPDU (a combination of HE PPDU and EHT PPDU or only EHT PPDU), if the bandwidth of the EHT PPDU being transmitted in Primary/Secondary 160 MHz is indicated as 320 MHz and there is no specific A-PPDU indicator, an error may occur when an OBSS EHT STA, an unassociated EHT STA, or an EHT STA with the dot11EHTBaseLineFeatureImplementedOnly parameter set to true decodes an EHT PPDU being transmitted in the corresponding Primary/Secondary 160 MHz. Therefore, in preparation for this case, in the EHT PPDU being transmitted on Primary/Secondary 160 MHz in A-PPDU (a combination of HE PPDU and EHT PPDU or only EHT PPDU), it may be desirable to include an A-PPDU indicator in addition to indicating 160 MHz or 320 MHz. In addition to this problem, if one EHT PPDU is transmitted rather than in A-PPDU format, because the bandwidth is indicated as 320 MHz, an error may occur when OBSS EHT STA or unassociated EHT STA decodes the EHT PPDU being transmitted in the corresponding Primary/Secondary 160 MHz. Therefore, this method may not be desirable in terms of sequence unification and unified preamble puncturing indication method. In this case, it can be resolved by considering one EHT PPDU indicator with SST applied (not in A-PPDU format), and this can use Reserved/Disregard/Validate bits among various signaling fields, and the bits used in the A-PPDU indicator can also be used as is. This is because A-PPDU also uses SST, and it can be considered to indicate the same through this. Alternatively, when SST is applied at 320 MHz, transmission of only one EHT PPDU rather than A-PPDU is not considered. In this case, it can be replaced with A-PPDU transmission that always considers the combination of sub EHT PPDU transmitted in Primary 160 MHz and sub EHT PPDU transmitted in Secondary 160 MHz (A combination of sub EHT PPDUs in 80 MHz units may be considered, but the sequence may be applied in 160 MHz units and the preamble puncturing instruction may also be applied in 160 MHz units.). In this way, a method for indicating sequence unification and unified preamble puncturing can be achieved. However, transmission of only one EHT PPDU rather than A-PPDU may not be considered only at 320 MHz where SST is used. In bandwidths other than 320 MHz, transmission of only one EHT PPDU, not A-PPDU, can be considered even if SST is applied.

In the above proposal, a new preamble puncturing pattern can be added to indicate preamble puncturing. For example, a preamble puncturing pattern corresponding to 1001 in OFDMA transmission and 3×996+242 Resource Unit (RU) in non-OFDMA transmission may be defined.

The PPDU indicator to which SST of Proposal 1.3 is applied may be applied not only to the environment of Proposal 1.3 but also to all PPDUs to which SST is generally applied.

When SST is applied at 320 MHz in Proposal 1.3, the proposal that does not consider transmission of only one EHT PPDU rather than A-PPDU may be applied in general situations other than the method for indicating sequence unification and unified preamble puncturing. In other words, when SST is applied at 320 MHz, transmission of only one EHT PPDU rather than A-PPDU is not always considered, and only transmission of A-PPDU (a combination of HE PPDU and EHT PPDU or only EHT PPDU) can be considered.

Figure 14:
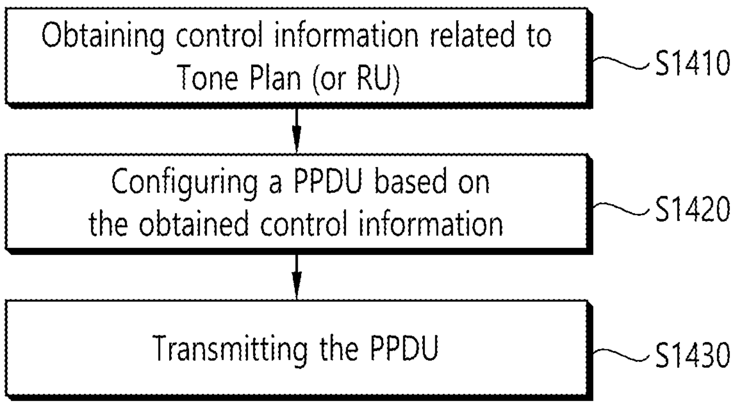
FIG. 14 is a process flow diagram illustrating the operation of the transmitting device according to this embodiment.

FIG. 14 is a process flow diagram illustrating the operation of the transmitting device according to this embodiment.

The example of FIG. 14 may be performed by a transmitting STA or a transmitting device (AP and/or non-AP STA).

Some of each step (or detailed sub-steps to be described later) in the example of FIG. 14 may be omitted or changed.

Through step S1410, the transmitting device (transmitting STA) may obtain information about the above-described tone plan. As described above, the information about the tone plan includes the size and location of the RU, control information related to the RU, information about a frequency band including the RU, information about an STA receiving the RU, and the like.

Through step S1420, the transmitting device may configure/generate a PPDU based on the acquired control information. A step of configuring/generating the PPDU may include a step of configuring/generating each field of the PPDU. That is, step S1420 includes a step of configuring the EHT-SIG field including control information about the tone plan. That is, step S1420 may include a step of configuring a field including control information (e.g. N bitmaps) indicating the size/position of the RU and/or a step of configuring a field including an identifier of an STA (e.g. AID) receiving the RU.

Also, step S1420 may include a step of generating an STF/LTF sequence transmitted through a specific RU. The STF/LTF sequence may be generated based on a preset STF generation sequence/LTF generation sequence.

Also, step S1420 may include a step of generating a data field (i.e., MPDU) transmitted through a specific RU.

The transmitting device may transmit the PPDU constructed through step S1420 to the receiving device based on step S1430.

While performing step S1430, the transmitting device may perform at least one of operations such as CSD, Spatial Mapping, IDFT/IFFT operation, and GI insertion.

A signal/field/sequence constructed according to the present specification may be transmitted in the form of FIG. 10.

Figure 15:
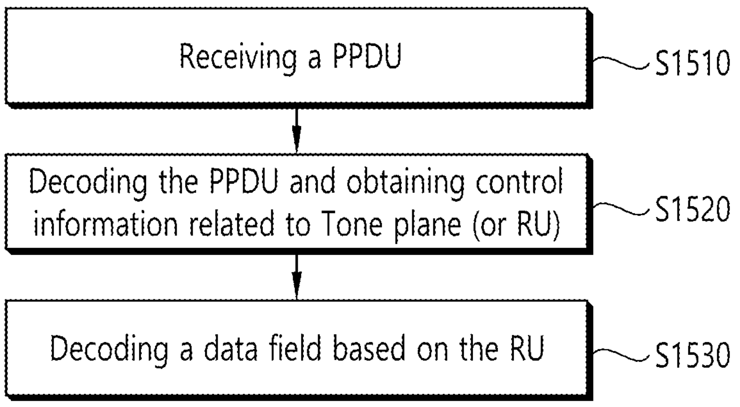
FIG. 15 is a process flow diagram illustrating the operation of the receiving device according to the present embodiment.

FIG. 15 is a process flow diagram illustrating the operation of the receiving device according to the present embodiment.

The aforementioned PPDU may be received according to the example of FIG. 15.

The example of FIG. 15 may be performed by a receiving STA or a receiving device (AP and/or non-AP STA).

Some of each step (or detailed sub-steps to be described later) in the example of FIG. 15 may be omitted.

The receiving device (receiving STA) may receive all or part of the PPDU through step S1510. The received signal may be in the form of FIG. 10.

The sub-step of step S1510 may be determined based on step S1430 of FIG. 14. That is, in step S1510, an operation of restoring the result of the CSD, Spatial Mapping, IDFT/IFFT operation, and GI insertion operation applied in step S1430 may be performed.

In step S1520, the receiving device may perform decoding on all/part of the PPDU. Also, the receiving device may obtain control information related to a tone plan (i.e., RU) from the decoded PPDU.

More specifically, the receiving device may decode the L-SIG and EHT-SIG of the PPDU based on the legacy STF/LTF and obtain information included in the L-SIG and EHT SIG fields. Information on various tone plans (i.e., RUs) described in this specification may be included in the EHT-SIG, and the receiving STA may obtain information on the tone plan (i.e., RU) through the EHT-SIG.

In step S1530, the receiving device may decode the remaining part of the PPDU based on information about the tone plan (i.e., RU) acquired through step S1520. For example, the receiving STA may decode the STF/LTF field of the PPDU based on information about one plan (i.e., RU). In addition, the receiving STA may decode the data field of the PPDU based on information about the tone plan (i.e., RU) and obtain the MPDU included in the data field.

In addition, the receiving device may perform a processing operation of transferring the data decoded through step S1530 to a higher layer (e.g., MAC layer). In addition, when generation of a signal is instructed from the upper layer to the PHY layer in response to data transmitted to the upper layer, a subsequent operation may be performed.

Hereinafter, the above-described embodiment will be described with reference to FIG. 1 to FIG. 15.

Figure 16:
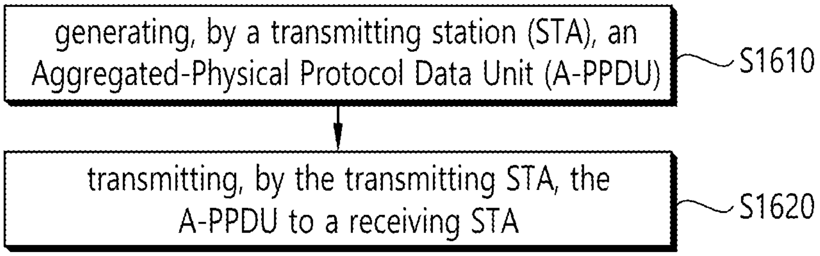
FIG. 16 is a flowchart illustrating a procedure in which a transmitting STA transmits an A-PPDU according to this embodiment.

FIG. 16 is a flowchart illustrating a procedure in which a transmitting STA transmits an A-PPDU according to this embodiment.

The example of FIG. 16 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The example of FIG. 16 is performed by a transmitting station (STA), and the transmitting STA may correspond to an access point (AP) STA. The receiving STA may correspond to a non-AP STA.

This embodiment proposes a method for applying sequence and preamble puncturing so that a receiving STA assigned to a secondary 160 MHz channel by SST performs a unified operation in a situation where a transmitting STA transmits an A-PPDU. The A-PPDU may be composed of a combination of HE PPDU and EHT PPDU, or may be composed of only EHT PPDU. This has the effect of allowing the receiving STA to perform a unified operation regardless of how the A-PPDU is combined and transmitted.

In step S1610, a transmitting station (STA) generates an Aggregated-Physical Protocol Data Unit (A-PPDU).

In step S1620, the transmitting STA transmits the A-PPDU to a receiving STA.

The A-PPDU includes a High Efficiency (HE) PPDU for a primary 160 MHz channel and an Extreme High Throughput (EHT) PPDU for a secondary 160 MHz channel. The first PPDU may be a High Efficiency (HE) PPDU or a first Extreme High Throughput (EHT) PPDU. The second PPDU may be a second EHT PPDU.

The receiving STA is allocated to the secondary 160 MHz channel by Subchannel Selective Transmission (SST). That is, this embodiment assumes that SST is applied.

The first PPDU is transmitted based on a first sequence for 160 MHz and a first preamble puncturing pattern for 160 MHz. The second PPDU is transmitted based on a second sequence for 160 MHz and a second preamble puncturing pattern for 160 MHZ.

That is, this embodiment proposes a method for always applying sequence and preamble puncturing for 160 MHz, regardless of the type of the A-PPDU and the bandwidth of the first and second PPDUs. As a result, the receiving STAs allocated to the secondary 160 MHz channel by SST can perform unified (or identical) operations, resulting in an implementation benefit.

The sequence and preamble puncturing for the 160 MHz can be defined as follows.

When the first PPDU is the HE PPDU, the HE PPDU may include a Legacy-Short Training Field (L-STF), a Legacy-Long Training Field (L-LTF), a Legacy-Signal (L-SIG), a Repeated Legacy-Signal (RL-SIG), and a High Efficiency-Signal (HE-SIG), a High Efficiency-Short Training Field (HE-STF), a High Efficiency-Long Training Field (HE-LTF), and a first data field.

The first sequence may include sequences of the L-STF, the L-LTF, the L-SIG, the RL-SIG, the HE-SIG, the HE-STF and the HE-LTF for the 160 MHz. The sequences of the L-STF, the L-LTF, the L-SIG, and the RL-SIG for the 160 MHz correspond to sequences defined in the legacy wireless LAN system, and the sequences of the HE-SIG, the HE-STF, and the HE-LTF for the 160 MHz may correspond to sequences defined in the 802.11ax wireless LAN system.

The first preamble puncturing pattern may include first punctured channel information for the 160 MHz. The first punctured channel information may be included in a Band-Width (BW) field in the HE-SIG.

For example, when a value of the first punctured channel information is set to 4, the secondary 20 MHz channel may be punctured in the 80 MHz channel. When the value of the first punctured channel information is set to 5, one of the two 20 MHz subchannels in the secondary 40 MHz channel in the 80 MHz channel may be punctured. When the value of the first punctured channel information is set to 6, 0 to 2 20 MHz subchannels may be punctured in the secondary 20 MHz channel and the secondary 80 MHz channel in the 160 MHz or 80+80 MHz channel. When the value of the first punctured channel information is set to 7, 0, 1, or 2 20 MHz subchannels are punctured in the secondary 40 MHz channel in the 160 MHz or 80+80 MHz channel, 0 to 2 20 MHz subchannels may be punctured in the secondary 80 MHz channel, and at this time, at least one 20 MHz subchannel may be punctured.

The first data field may be transmitted in a punctured channel based on the first punctured channel information.

When the first PPDU is the first EHT PPDU, the first and second EHT PPDUs may include a L-STF, a L-LTF, a L-SIG, a RL-SIG, a Universal-Signal (U-SIG), an EHT-SIG, an EHT-STF, an EHT-LTF, and a second data field.

The first and second sequences may include sequences of the L-STF, the L-LTF, the L-SIG, the RL-SIG, the U-SIG, the EHT-SIG, the EHT-STF, and the EHT-LTF for the 160 MHz. The sequences of the L-STF, the L-LTF, the L-SIG, and the RL-SIG for the 160 MHZ correspond to sequences defined in the legacy wireless LAN system, and the sequences of the U-SIG, the EHT-SIG, the EHT-STF, and the EHT-LTF for 160 MHz may correspond to sequences defined in the 802.11be wireless LAN system.

The first and second preamble puncturing patterns may include second punctured channel information for the 160 MHz. The second punctured channel information may be included in a Punctured Channel Information field in the U-SIG.

For example, when the A-PPDU is transmitted in a non-Orthogonal Frequency Division Multiplex Access (non-OFDMA) scheme, the second punctured channel information may consist of 5 bits.

The secondary 160 MHz channel may include first to eighth 20 MHz subchannels. The first to eighth 20 MHz subchannels may be arranged in frequency order from low to high.

When a value of the second punctured channel information is 1, the first 20 MHz subchannel may be punctured in the secondary 160 MHz channel (996+484+242-tone MRU 1). When the value of the second punctured channel information is 2, the second 20 MHz subchannel may be punctured in the secondary 160 MHz channel (996+484+242-tone MRU 2). When the value of the second punctured channel information is 3, the third 20 MHz subchannel may be punctured in the secondary 160 MHz channel (996+484+242-tone MRU 3). When the value of the second punctured channel information is 4, the fourth 20 MHz subchannel may be punctured in the secondary 160 MHz channel (996+484+242-tone MRU 4). When the value of the second punctured channel information is 5, the fifth 20 MHz subchannel may be punctured in the secondary 160 MHz channel (996+484+242-tone MRU 5). When the value of the second punctured channel information is 6, the sixth 20 MHz subchannel may be punctured in the secondary 160 MHz channel (996+484+242-tone MRU 6). When the value of the second punctured channel information is 7, the seventh 20 MHz subchannel may be punctured in the secondary 160 MHz channel (996+484+242-tone MRU 7). When the value of the second punctured channel information is 8, the eighth 20 MHz subchannel may be punctured in the secondary 160 MHz channel (996+484+242-tone MRU 8). When the value of the second punctured channel information is 9, the first and second 20 MHz subchannels may be punctured in the secondary 160 MHz channel (996+484-tone MRU 1). When the value of the second punctured channel information is 10, the third and fourth 20 MHz subchannels may be punctured in the secondary 160 MHz channel (996+484-tone MRU 2). When the value of the second punctured channel information is 11, the fifth and sixth 20 MHz subchannels may be punctured in the secondary 160 MHz channel (996+484-tone MRU 3). When the value of the second punctured channel information is 12, the seventh and eighth 20 MHz subchannels may be punctured in the secondary 160 MHz channel (996+484-tone MRU 4).

As another example, when the A-PPDU is transmitted in an OFDMA scheme, the secondary 160 MHz channel may include first and second 80 MHz subchannels. The first and second 80 MHz subchannels may include first to fourth 20 MHz subchannels.

The second punctured channel information may consist of a 4-bit bitmap for each of the first and second 80 MHz subchannels.

The first and second 80 MHz subchannels may be arranged in frequency order from low to high. The first to fourth 20 MHz subchannels may be arranged in frequency order from low to high.

When the 4-bit bitmap is 0111, the first 20 MHz subchannel may be punctured in the first or second 80 MHz subchannel. When the 4-bit bitmap is 1011, the second 20 MHz subchannel may be punctured in the first or second 80

MHz subchannel. When the 4-bit bitmap is 1101, the third 20 MHz subchannel may be punctured in the first or second 80 MHz subchannel. When the 4-bit bitmap is 1110, the fourth 20 MHz subchannel may be punctured in the first or second 80 MHz subchannel. When the 4-bit bitmap is 0011, the first and second 20 MHz subchannels may be punctured in the first or second 80 MHz subchannel. When the 4-bit bitmap is 1100, the third and fourth 20 MHz subchannels may be punctured in the first or second 80 MHz subchannel. When the 4-bit bitmap is 1001, the second and third 20 MHz subchannels may be punctured in the first or second 80 MHz subchannel.

The second data field may be transmitted in a punctured channel based on the second punctured channel information.

Additionally, the A-PPDU may further include an A-PPDU indicator indicating that it is an A-PPDU. If there is no A-PPDU indicator, this is because an error may occur when an OBSS EHT STA, unassociated EHT STA, or an EHT STA with the dot11EHTBaseLineFeatureImplementedOnly parameter set to true decodes the EHT PPDU being transmitted on the primary 160 MHz channel or the secondary 160 MHz channel.

Figure 17:
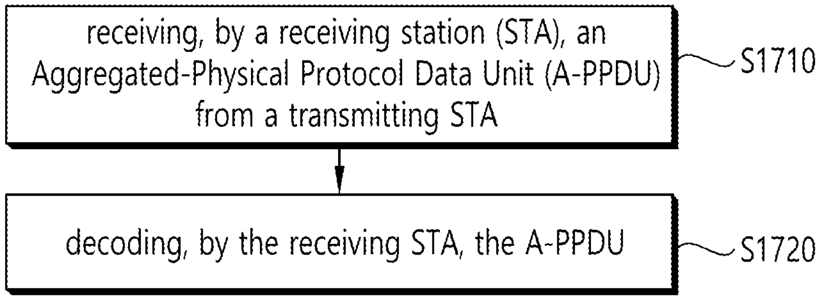
FIG. 17 is a flowchart illustrating a procedure in which a receiving STA receives an A-PPDU according to this embodiment.

FIG. 17 is a flowchart illustrating a procedure in which a receiving STA receives an A-PPDU according to this embodiment.

The example of FIG. 17 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

The example of FIG. 17 is performed by a receiving station (STA), and the receiving STA may correspond to a non-access point (non-AP) STA. The transmitting STA may correspond to an AP STA.

This embodiment proposes a method for applying sequence and preamble puncturing so that a receiving STA assigned to a secondary 160 MHz channel by SST performs a unified operation in a situation where a transmitting STA transmits an A-PPDU. The A-PPDU may be composed of a combination of HE PPDU and EHT PPDU, or may be composed of only EHT PPDU. This has the effect of allowing the receiving STA to perform a unified operation regardless of how the A-PPDU is combined and transmitted.

In step S1710, a receiving station (STA) an Aggregated-Physical Protocol Data Unit (A-PPDU) from a transmitting STA.

In step S1720, the receiving STA decodes the A-PPDU.

The A-PPDU includes a High Efficiency (HE) PPDU for a primary 160 MHz channel and an Extreme High Throughput (EHT) PPDU for a secondary 160 MHz channel. The first PPDU may be a High Efficiency (HE) PPDU or a first Extreme High Throughput (EHT) PPDU. The second PPDU may be a second EHT PPDU.

The receiving STA is allocated to the secondary 160 MHz channel by Subchannel Selective Transmission (SST). That is, this embodiment assumes that SST is applied.

The first PPDU is transmitted based on a first sequence for 160 MHz and a first preamble puncturing pattern for 160 MHz. The second PPDU is transmitted based on a second sequence for 160 MHz and a second preamble puncturing pattern for 160 MHz.

That is, this embodiment proposes a method for always applying sequence and preamble puncturing for 160 MHz, regardless of the type of the A-PPDU and the bandwidth of the first and second PPDUs. As a result, the receiving STAs allocated to the secondary 160 MHz channel by SST can perform unified (or identical) operations, resulting in an implementation benefit.

The sequence and preamble puncturing for the 160 MHz can be defined as follows.

When the first PPDU is the HE PPDU, the HE PPDU may include a Legacy-Short Training Field (L-STF), a Legacy-Long Training Field (L-LTF), a Legacy-Signal (L-SIG), a Repeated Legacy-Signal (RL-SIG), and a High Efficiency-Signal (HE-SIG), a High Efficiency-Short Training Field (HE-STF), a High Efficiency-Long Training Field (HE-LTF), and a first data field.

The first sequence may include sequences of the L-STF, the L-LTF, the L-SIG, the RL-SIG, the HE-SIG, the HE-STF and the HE-LTF for the 160 MHz. The sequences of the L-STF, the L-LTF, the L-SIG, and the RL-SIG for the 160 MHz correspond to sequences defined in the legacy wireless LAN system, and the sequences of the HE-SIG, the HE-STF, and the HE-LTF for the 160 MHz may correspond to sequences defined in the 802.11ax wireless LAN system.

The first preamble puncturing pattern may include first punctured channel information for the 160 MHz. The first punctured channel information may be included in a Band-Width (BW) field in the HE-SIG.

For example, when a value of the first punctured channel information is set to 4, the secondary 20 MHz channel may be punctured in the 80 MHz channel. When the value of the first punctured channel information is set to 5, one of the two 20 MHz subchannels in the secondary 40 MHz channel in the 80 MHz channel may be punctured. When the value of the first punctured channel information is set to 6, 0 to 2 20 MHz subchannels may be punctured in the secondary 20 MHz channel and the secondary 80 MHz channel in the 160 MHz or 80+80 MHz channel. When the value of the first punctured channel information is set to 7, 0, 1, or 2 20 MHz subchannels are punctured in the secondary 40 MHz channel in the 160 MHz or 80+80 MHz channel, 0 to 2 20 MHz subchannels may be punctured in the secondary 80 MHz channel, and at this time, at least one 20 MHz subchannel may be punctured.

The first data field may be transmitted in a punctured channel based on the first punctured channel information.

When the first PPDU is the first EHT PPDU, the first and second EHT PPDUs may include a L-STF, a L-LTF, a L-SIG, a RL-SIG, a Universal-Signal (U-SIG), an EHT-SIG, an EHT-STF, an EHT-LTF, and a second data field.

The first and second sequences may include sequences of the L-STF, the L-LTF, the L-SIG, the RL-SIG, the U-SIG, the EHT-SIG, the EHT-STF, and the EHT-LTF for the 160 MHz. The sequences of the L-STF, the L-LTF, the L-SIG, and the RL-SIG for the 160 MHZ correspond to sequences defined in the legacy wireless LAN system, and the sequences of the U-SIG, the EHT-SIG, the EHT-STF, and the EHT-LTF for 160 MHz may correspond to sequences defined in the 802.11be wireless LAN system.

The first and second preamble puncturing patterns may include second punctured channel information for the 160 MHz. The second punctured channel information may be included in a Punctured Channel Information field in the U-SIG.

For example, when the A-PPDU is transmitted in a non-Orthogonal Frequency Division Multiplex Access (non-OFDMA) scheme, the second punctured channel information may consist of 5 bits.

The secondary 160 MHz channel may include first to eighth 20 MHz subchannels. The first to eighth 20 MHz subchannels may be arranged in frequency order from low to high.

When a value of the second punctured channel information is 1, the first 20 MHz subchannel may be punctured in the secondary 160 MHz channel (996+484+242-tone MRU 1). When the value of the second punctured channel information is 2, the second 20 MHz subchannel may be punctured in the secondary 160 MHz channel (996+484+242-tone MRU 2). When the value of the second punctured channel information is 3, the third 20 MHz subchannel may be punctured in the secondary 160 MHz channel (996+484+242-tone MRU 3). When the value of the second punctured channel information is 4, the fourth 20 MHz subchannel may be punctured in the secondary 160 MHz channel (996+484+242-tone MRU 4). When the value of the second punctured channel information is 5, the fifth 20 MHz subchannel may be punctured in the secondary 160 MHz channel (996+484+242-tone MRU 5). When the value of the second punctured channel information is 6, the sixth 20 MHz subchannel may be punctured in the secondary 160 MHz channel (996+484+242-tone MRU 6). When the value of the second punctured channel information is 7, the seventh 20 MHz subchannel may be punctured in the secondary 160 MHz channel (996+484+242-tone MRU 7). When the value of the second punctured channel information is 8, the eighth 20 MHz subchannel may be punctured in the secondary 160 MHz channel (996+484+242-tone MRU 8). When the value of the second punctured channel information is 9, the first and second 20 MHz subchannels may be punctured in the secondary 160 MHz channel (996+484-tone MRU 1). When the value of the second punctured channel information is 10, the third and fourth 20 MHz subchannels may be punctured in the secondary 160 MHz channel (996+484-tone MRU 2). When the value of the second punctured channel information is 11, the fifth and sixth 20 MHz subchannels may be punctured in the secondary 160 MHz channel (996+484-tone MRU 3). When the value of the second punctured channel information is 12, the seventh and eighth 20 MHz subchannels may be punctured in the secondary 160 MHz channel (996+484-tone MRU 4).

As another example, when the A-PPDU is transmitted in an OFDMA scheme, the secondary 160 MHz channel may include first and second 80 MHz subchannels. The first and second 80 MHz subchannels may include first to fourth 20 MHz subchannels.

The second punctured channel information may consist of a 4-bit bitmap for each of the first and second 80 MHz subchannels.

The first and second 80 MHz subchannels may be arranged in frequency order from low to high. The first to fourth 20 MHz subchannels may be arranged in frequency order from low to high.

When the 4-bit bitmap is 0111, the first 20 MHz subchannel may be punctured in the first or second 80 MHz subchannel. When the 4-bit bitmap is 1011, the second 20 MHz subchannel may be punctured in the first or second 80 MHz subchannel. When the 4-bit bitmap is 1101, the third 20 MHz subchannel may be punctured in the first or second 80 MHz subchannel. When the 4-bit bitmap is 1110, the fourth 20 MHz subchannel may be punctured in the first or second 80 MHz subchannel. When the 4-bit bitmap is 0011, the first and second 20 MHz subchannels may be punctured in the first or second 80 MHz subchannel. When the 4-bit bitmap is 1100, the third and fourth 20 MHz subchannels may be punctured in the first or second 80 MHz subchannel. When the 4-bit bitmap is 1001, the second and third 20 MHz subchannels may be punctured in the first or second 80 MHz subchannel.

The second data field may be transmitted in a punctured channel based on the second punctured channel information.

Additionally, the A-PPDU may further include an A-PPDU indicator indicating that it is an A-PPDU. If there is no A-PPDU indicator, this is because an error may occur when an OBSS EHT STA, unassociated EHT STA, or an EHT STA with the dot11EHTBaseLineFeatureImplementedOnly parameter set to true decodes the EHT PPDU being transmitted on the primary 160 MHz channel or the secondary 160 MHz channel.

2. Device Configuration

The technical features of the present disclosure may be applied to various devices and methods. For example, the technical features of the present disclosure may be performed/supported through the device(s) of FIG. 1 and/or FIG. 11. For example, the technical features of the present disclosure may be applied to only part of FIG. 1 and/or FIG. 11. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device according to the present disclosure receives an Aggregated-Physical Protocol Data Unit (A-PPDU) from a transmitting station (STA); and decodes the A-PPDU.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including receiving an Aggregated-Physical Protocol Data Unit (A-PPDU) from a transmitting station (STA); and decoding the A-PPDU. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 11. Meanwhile, the CRM of the present disclosure may be the memory 112, 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:

receiving, by a receiving station (STA), an Aggregated-Physical Protocol Data Unit (A-PPDU) from a transmitting STA through a 320 MHz bandwidth; and decoding, by the receiving STA, the A-PPDU, wherein the 320 MHz bandwidth includes a primary 160 MHz channel and a secondary 160 MHz channel, wherein the A-PPDU includes a first PPDU for the primary 160 MHZ channel and a second PPDU for the secondary 160 MHz channel, wherein the receiving STA is allocated to the secondary 160 MHz channel by Subchannel Selective Transmission (SST), wherein the first PPDU is transmitted based on a first sequence and a first preamble puncturing pattern for the primary 160 MHz channel, wherein the second PPDU is transmitted based on a second sequence and a second preamble puncturing pattern the secondary 160 MHz channel, wherein the first sequence and the first preamble puncturing pattern for the primary 160 MHz channel are applied regardless of a type of the A-PPDU and a bandwidth of the first PPDU, wherein the second sequence and the second preamble puncturing pattern for the secondary 160 MHz channel are applied regardless of the type of the A-PPDU and a bandwidth of the second PPDU, and wherein the type of the A-PPDU relates to a combination of a High Efficiency (HE) PPDU and an Extreme High Throughput (EHT) PPDU or a combination of only EHT PPDUs.

2. The method of claim 1, wherein the first PPDU is a HE PPDU or a first EHT PPDU, and wherein the second PPDU is a second EHT PPDU.

3. The method of claim 2, wherein, based on the first PPDU being the HE PPDU, the HE PPDU includes a Legacy-Short Training Field (L-STF), a Legacy-Long Training Field (L-LTF), a Legacy-Signal (L-SIG), a Repeated Legacy-Signal (RL-SIG), and a High Efficiency-Signal (HE-SIG), a High Efficiency-Short Training Field (HE-STF), a High Efficiency-Long Training Field (HE-LTF), and a first data field, and wherein the first sequence for the primary 160 MHz channel includes sequences of the L-STF, the L-LTF, the L-SIG, the RL-SIG, the HE-SIG, the HE-STF and the HE-LTF for a 160 MHz transmission.

4. The method of claim 3, wherein the first preamble puncturing pattern includes first punctured channel information for the 160 MHz transmission, wherein the first punctured channel information is included in a BandWidth (BW) field in the HE-SIG, and wherein the first data field is transmitted in a punctured channel based on the first punctured channel information.

5. The method of claim 2, wherein, based on the first PPDU being the first EHT PPDU, the first and second EHT PPDUs include a L-STF, a L-LTF, a L-SIG, a RL-SIG, a Universal-Signal (U-SIG), an EHT-SIG, an EHT-STF, an EHT-LTF, and a second data field, wherein the first sequence for the primary 160 MHz channel includes sequences of the L-STF, the L-LTF, the L-SIG, the RL-SIG, the U-SIG, the EHT-SIG, the EHT-STF, and the EHT-LTF for a 160 MHz transmission, and wherein the second sequence for the secondary 160 MHz channel includes sequences of the L-STF, the L-LTF, the L-SIG, the RL-SIG, the U-SIG, the EHT-SIG, the EHT-STF, and the EHT-LTF for the 160 MHz transmission.

6. The method of claim 5, wherein the first and second preamble puncturing patterns include second punctured channel information for the 160 MHz transmission, wherein the second punctured channel information is included in a Punctured Channel Information field in the U-SIG, and wherein the second data field is transmitted in a punctured channel based on the second punctured channel information.

7. The method of claim 6, wherein, based on the A-PPDU being transmitted in a non-Orthogonal Frequency Division Multiplex Access (non-OFDMA) scheme, the second punctured channel information consists of 5 bits, wherein the secondary 160 MHz channel includes first to eighth 20 MHZ subchannels, wherein the first to eighth 20 MHz subchannels are arranged in frequency order from low to high, wherein when a value of the second punctured channel information is 1, the first 20 MHz subchannel is punctured in the secondary 160 MHz channel, wherein when the value of the second punctured channel information is 2, the second 20 MHz subchannel is punctured in the secondary 160 MHz channel, wherein when the value of the second punctured channel information is 3, the third 20 MHz subchannel is punctured in the secondary 160 MHz channel, wherein when the value of the second punctured channel information is 4, the fourth 20 MHz subchannel is punctured in the secondary 160 MHz channel, wherein when the value of the second punctured channel information is 5, the fifth 20 MHz subchannel is punctured in the secondary 160 MHz channel, wherein when the value of the second punctured channel information is 6, the sixth 20 MHz subchannel is punctured in the secondary 160 MHz channel, wherein when the value of the second punctured channel information is 7, the seventh 20 MHz subchannel is punctured in the secondary 160 MHz channel, wherein when the value of the second punctured channel information is 8, the eighth 20 MHz subchannel is punctured in the secondary 160 MHz channel, wherein when the value of the second punctured channel information is 9, the first and second 20 MHz subchannels are punctured in the secondary 160 MHz channel, wherein when the value of the second punctured channel information is 10, the third and fourth 20 MHz subchannels are punctured in the secondary 160 MHz channel, wherein when the value of the second punctured channel information is 11, the fifth and sixth 20 MHz subchannels are punctured in the secondary 160 MHz channel, and wherein when the value of the second punctured channel information is 12, the seventh and eighth 20 MHz subchannels are punctured in the secondary 160 MHZ channel.

8. The method of claim 6, wherein, based on the A-PPDU being transmitted in an OFDMA scheme, the secondary 160 MHz channel includes first and second 80 MHz subchannels, wherein the first and second 80 MHz subchannels include first to fourth 20 MHz subchannels, wherein the second punctured channel information consists of a 4-bit bitmap for each of the first and second 80 MHz subchannels, wherein the first and second 80 MHz subchannels are arranged in frequency order from low to high, wherein the first to fourth 20 MHz subchannels are arranged in frequency order from low to high, wherein when the 4-bit bitmap is 0111, the first 20 MHz subchannel is punctured in the first or second 80 MHz subchannel, wherein when the 4-bit bitmap is 1011, the second 20 MHZ subchannel is punctured in the first or second 80 MHz subchannel, wherein when the 4-bit bitmap is 1101, the third 20 MHz subchannel is punctured in the first or second 80 MHz subchannel, wherein when the 4-bit bitmap is 1110, the fourth 20 MHz subchannel is punctured in the first or second 80 MHz subchannel, wherein when the 4-bit bitmap is 0011, the first and second 20 MHz subchannels are punctured in the first or second 80 MHz subchannel, wherein when the 4-bit bitmap is 1100, the third and fourth 20 MHz subchannels are punctured in the first or second 80 MHz subchannel, and wherein when the 4-bit bitmap is 1001, the second and third 20 MHz subchannels are punctured in the first or second 80 MHz subchannel.

9. A receiving station (STA) in a wireless local area network (WLAN) system, the receiving STA comprising:

a memory;

a transceiver; and a processor being operatively connected to the memory and the transceiver, wherein the processor is configured to:

receive an Aggregated-Physical Protocol Data Unit (A-PPDU) from a transmitting STA through a 320 MHz bandwidth; and decode the A-PPDU, wherein the 320 MHz bandwidth includes a primary 160 MHz channel and a secondary 160 MHz channel, wherein the first PPDU is transmitted based on a first sequence and a first preamble puncturing pattern for the primary 160 MHz channel, wherein the second PPDU is transmitted based on a second sequence and a second preamble puncturing pattern for the secondary 160 MHz channel, wherein the first sequence and the first preamble puncturing pattern for the primary 160 MHz channel are applied regardless of a type of the A-PPDU and a bandwidth of the first PPDU, wherein the second sequence and the second preamble puncturing pattern for the secondary 160 MHz channel are applied regardless of the type of the A-PPDU and a bandwidth of the second PPDU, and wherein the type of the A-PPDU relates to a combination of a High Efficiency (HE) PPDU and an Extreme High Throughput (EHT) PPDU or a combination of only EHT PPDUs.

10. A method in a wireless local area network (WLAN) system, the method comprising:

generating, by a transmitting station (STA), an Aggregated-Physical Protocol Data Unit (A-PPDU); and transmitting, by the transmitting STA, the A-PPDU to a receiving STA through a 320 MHz bandwidth, wherein the 320 MHz bandwidth includes a primary 160 MHz channel and a secondary 160 MHz channel, wherein the A-PPDU includes a first PPDU for the primary 160 MHz channel and a second PPDU for the secondary 160 MHz channel, wherein the receiving STA is allocated to the secondary 160 MHz channel by Subchannel Selective Transmission (SST), wherein the first PPDU is transmitted based on a first sequence and a first preamble puncturing pattern for the primary 160 MHz channel, wherein the second PPDU is transmitted based on a second sequence and a second preamble puncturing pattern for the secondary 160 MHz channel, wherein the first sequence and the first preamble puncturing pattern for the primary 160 MHz channel are applied regardless of a type of the A-PPDU and a bandwidth of the first PPDU, wherein the second sequence and the second preamble puncturing pattern for the secondary 160 MHz channel are applied regardless of the type of the A-PPDU and a bandwidth of the second PPDU, and wherein the type of the A-PPDU relates to a combination of a High Efficiency (HE) PPDU and an Extreme High Throughput (EHT) PPDU or a combination of only EHT PPDUs.

11. The method of claim 10, wherein the first PPDU is a HE PPDU or a first EHT PPDU, and wherein the second PPDU is a second EHT PPDU.

12. The method of claim 11, wherein, based on the first PPDU being the HE PPDU, the HE PPDU includes a Legacy-Short Training Field (L-STF), a Legacy-Long Training Field (L-LTF), a Legacy-Signal (L-SIG), a Repeated Legacy-Signal (RL-SIG), and a High Efficiency-Signal (HE-SIG), a High Efficiency-Short Training Field (HE-STF), a High Efficiency-Long Training Field (HE-LTF), and a first data field, and wherein the first sequence for the primary 160 MHz channel includes sequences of the L-STF, the L-LTF, the L-SIG, the RL-SIG, the HE-SIG, the HE-STF and the HE-LTF for a 160 MHz transmission.

13. The method of claim 12, wherein the first preamble puncturing pattern includes first punctured channel information for the 160 MHz transmission, wherein the first punctured channel information is included in a BandWidth (BW) field in the HE-SIG, and wherein the first data field is transmitted in a punctured channel based on the first punctured channel information.

14. The method of claim 11, wherein, based on the first PPDU being the first EHT PPDU, the first and second EHT PPDUs include a L-STF, a L-LTF, a L-SIG, a RL-SIG, a Universal-Signal (U-SIG), an EHT-SIG, an EHT-STF, an EHT-LTF, and a second data field, wherein the first sequence for the primary 160 MHz channel include sequences of the L-STF, the L-LTF, the L-SIG, the RL-SIG, the U-SIG, the EHT-SIG, the EHT-STF, and the EHT-LTF for a 160 MHz transmission, and wherein the second sequence for the secondary 160 MHz channel includes sequences of the L-STF, the L-LTF, the L-SIG, the RL-SIG, the U-SIG, the EHT-SIG, the EHT-STF, and the EHT-LTF for the 160 MHz transmission.

15. The method of claim 14, wherein the first and second preamble puncturing patterns include second punctured channel information for the 160 MHz transmission, wherein the second punctured channel information is included in a Punctured Channel Information field in the U-SIG, and wherein the second data field is transmitted in a punctured channel based on the second punctured channel information.

* * * * *